United States Patent
Holland et al.

(10) Patent No.: US 10,747,671 B1
(45) Date of Patent: Aug. 18, 2020

(54) SYSTEM AND METHOD FOR INTELLIGENT TILE-BASED PREFETCHING OF IMAGE FRAMES IN A SYSTEM ON A CHIP

(71) Applicant: QUALCOMM INCORPORATED, San Diego, CA (US)

(72) Inventors: Wesley James Holland, La Jolla, CA (US); Bohuslav Rychlik, San Diego, CA (US); Andrew Edmund Turner, San Diego, CA (US); George Patsilaras, San Diego, CA (US); Jeffrey Shabel, San Diego, CA (US); Simon Peter William Booth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/269,440

(22) Filed: Feb. 6, 2019

(51) Int. Cl.
  *G06T 1/60* (2006.01)
  *G06F 12/0862* (2016.01)
  *G06F 12/1009* (2016.01)

(52) U.S. Cl.
  CPC ...... *G06F 12/0862* (2013.01); *G06F 12/1009* (2013.01); *G06T 1/60* (2013.01)

(58) Field of Classification Search
  CPC .. G06F 3/0638; G06F 3/1297; G06F 9/30178; G06F 12/0822; G06F 12/0831; G06F 12/0837; G06F 12/0815; G06F 16/188; G06F 21/00; G06F 21/85; G06F 2212/1016; G06F 2212/62; G06F 2212/401; G06T 9/00; G06T 15/00
  See application file for complete search history.

(56) References Cited

U.S. PATENT DOCUMENTS

2016/0350212 A1* 12/2016 Jeong ............... G06F 3/0604
2018/0157591 A1*  6/2018 Wilkerson ........ G06F 12/0862
2019/0332525 A1* 10/2019 Anghel ................ G06N 3/08

* cited by examiner

*Primary Examiner* — Diane M Wills
(74) *Attorney, Agent, or Firm* — Smith Tempel Blaha LLC

(57) ABSTRACT

An intelligent tile-based prefetching solution executed by a compression address aperture services linearly addressed data requests from a processor to memory stored in a memory component having a tile-based address structure. The aperture monitors tile reads and seeks to match the tile read pattern to a predefined pattern. If a match is determined, the aperture executes a prefetching algorithm uniquely and optimally associated with the predefined tile read pattern. In this way, tile overfetch is mitigated while the latency on first line data reads is reduced.

26 Claims, 12 Drawing Sheets

Tiled image frame pre-fetched in response to recognition of a Vertical Stripe read pattern

| 1 | 2 | 3 | ... | K-1 | K | HK+1 | HK+2 | HK+3 | ... | HK+K-1 | HK+K |
|---|---|---|---|---|---|---|---|---|---|---|---|
| K+1 | K+2 | K+3 | ... | 2K-1 | 2K | HK+K+1 | HK+K+2 | HK+K+3 | ... | HK+2K-1 | HK+2K |
| 2K+1 | 2K+2 | 2K-3 | ... | 3K-1 | 3K | HK+2K+1 | HK+2K+2 | HK+2K+3 | ... | HK+3K-1 | HK+3K |
| ... | ... | ... | ... | ... | ... | ... | ... | ... | ... | ... | ... |
| (H-2)K+1 | (H-2)K+2 | (H-2)K+3 | ... | (H-1)K-1 | (H-1)K | (2HK-2K)+1 | (2HK-2K)+2 | (2HK-2K)+3 | ... | (2HK-K)-1 | 2HK-K |
| (H-1)K+1 | (H-1)K+2 | (H-1)K+3 | ... | HK-1 | HK | (2HK-K)+1 | (2HK-K)+2 | (2HK-K)+3 | ... | 2HK-1 | 2HK |

500

LEGEND

☐ = Not pre-fetched tiles

▨ = Pre-fetched tiles

Tiled image frame pre-fetched in response to recognition of a Horizontal Patch read pattern

| 1 | 2 | ... | K | HK+1 | HK+2 | ... | HK+K | 2HK+1 | 2HK+2 | ... | 2HK+K |
|---|---|---|---|---|---|---|---|---|---|---|---|
| K+1 | K+2 | ... | 2K | HK+K+1 | HK+K+2 | ... | HK+2K | 2HK+K+1 | 2HK+K+2 | ... | 2HK+2K |
| 2K+1 | 2K+2 | ... | 3K | HK+2K+1 | HK+2K+2 | ... | HK+3K | 2HK+2K+1 | 2HK+2K+2 | ... | 2HK+3K |
| ... | ... | ... | ... | ... | ... | ... | ... | ... | ... | ... | ... |
| (H-2)K+1 | (H-2)K+2 | ... | (H-1)K | 2HK-2K+1 | 2HK-2K+2 | ... | 2HK-K | 3HK-2K+1 | 3HK-2K+2 | ... | 3HK-K |
| (H-1)K+1 | (H-1)K+2 | ... | HK | 2HK-K+1 | 2HK-K+2 | ... | 2HK | 3HK-K+1 | 3HK-K+2 | ... | 3HK |
| 3HK+1 | 3HK+2 | ... | 3HK+K | 4HK+1 | 4HK+2 | ... | 4HK+K | 5HK+1 | 5HK+2 | ... | 5HK+K |
| 3HK+K+1 | 3HK+K+2 | ... | 3HK+2K | 4HK+K+1 | 4HK+K+2 | ... | 4HK+2K | 5HK+K+1 | 5HK+K+2 | ... | 5HK+2K |
| 3HK+2K+1 | 3HK+2K+2 | ... | 3HK+3K | 4HK+2K+1 | 4HK+2K+2 | ... | 4HK+3K | 5HK+2K+1 | 5HK+2K+2 | ... | 5HK+3K |
| ... | ... | ... | ... | ... | ... | ... | ... | ... | ... | ... | ... |
| 4HK-2K+1 | 4HK-2K+2 | ... | 4HK-K | 5HK-2K+1 | 5HK-2K+2 | ... | 5HK-K | 6HK-2K+1 | 6HK-2K+2 | ... | 6HK-K |
| 4HK-K+1 | 4HK-K+2 | ... | 4HK | 5HK-K+1 | 5HK-K+2 | ... | 5HK | 6HK-K+1 | 6HK-K+2 | ... | 6HK |

600

LEGEND

☐ = Not pre-fetched tiles

▨ = Pre-fetched tiles

SYSTEM AND METHOD FOR INTELLIGENT TILE-BASED PREFETCHING OF IMAGE FRAMES IN A SYSTEM ON A CHIP

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. PCDs commonly contain integrated circuits, or systems on a chip ("SoC"), that include numerous components designed to work together to deliver functionality to a user. For example, a SoC may contain any number of processing engines such as modems, central processing units ("CPUs") made up of cores, graphical processing units ("GPUs"), etc. that read and write data and instructions to and from memory components on the SoC. The data and instructions are transmitted between the devices via a collection of wires known as a bus.

The efficient sizing of bus bandwidth and memory components in a PCD is important for optimizing the functional capabilities of processing components on the SoC and guaranteeing a minimum required quality of service ("QoS") level. Commonly, the utilization of memory capacity and bus bandwidth is further optimized by compressing data so that the data requires less bus bandwidth to transmit and less space in the memory for storage.

Often, data being written to a memory component from a processor is compressed, not by the processor, but by a compression address aperture through which the data and instructions are transmitted. In such a case, while the processor may have associated an uncompressed, linear memory address with the data (an address it will inevitably leverage at a later time to read the data), the compression address aperture may have associated with the data a compressed, non-linear memory address (an address that it will inevitably need to use in order to service a later read request for the data). The reality that two different memory addresses are associated with the same data (thereby requiring an address lookup when retrieving the data from memory), coupled with the reality that the data must be decompressed before it can be returned in service to a later read request from the processor, results in a latency factor for servicing a read request for the data.

To further complicate matters and negatively impact read transaction latency, it is common for the memory component to be organized according to image frames that are subdivided into tiles, each having a width of multiple words and a height of multiple data lines. As such, when the processor makes a read request for linearly stored data, the compression address aperture may be required to read a series of tiles in order to retrieve a given line of data, the given line of data having been stored across multiple adjacent tiles in an image frame. The result is that while subsequent lines of data in the retrieved tiles may be quickly decompressed from cache and returned to the processor, the initial line of data requested by the processor may experience an exceptionally high latency due to the fact that it could not be decompressed and returned to the processor until all the relevant tiles containing a portion of the requested data line were retrieved into the cache of the compression address aperture.

To combat the above stated problem in the art, prior art solutions have employed various systems and methods for pre-fetching tiles of data in an effort to anticipate future read requests from a processor. Prior art solutions for prefetching data tiles, however, have proven inefficient and prone to over-fetching of tiles, particularly in the case of processors linearly accessing tile-organized data, thereby unnecessarily consuming processing power and cache capacity at the compression address aperture, not to mention unnecessarily consuming bus bandwidth between the compression address aperture and the memory bank. Therefore, there is a need in the art for improved systems and methods for tile-based prefetching. More specifically, there is a need in the art for an intelligent tile-based prefetching system and method.

SUMMARY OF THE DISCLOSURE

Various embodiments of methods and systems for intelligent tile-based prefetching in a portable computing device ("PCD") are disclosed. An exemplary method begins by receiving at an address aperture one or more data requests from a processing component. The processing component may be unaware of the tile-based address structure of the memory component and the one or more data requests from the processing component may comprise a linear memory address. In response to receiving the one or more data requests, the address aperture reads a plurality of data tiles associated with an image stored in a memory component having a tile-based address structure. The address aperture monitors the reading of the plurality of data tiles to determine a first data tile read pattern. Advantageously, in response to determining the first data tile read pattern, the address aperture may execute a first data tile prefetching algorithm associated with the first data tile read pattern such that the first data tile prefetching algorithm operates to prefetch data tiles from the memory component and store the prefetched data tiles in a tile-aware cache.

The address aperture, which may be in the form of a compression address aperture, may determine that the first data tile read pattern has discontinued and, in response, discontinue the execution of the first data tile prefetching algorithm. Subsequently, or at substantially the same time, the address aperture may, from a continued monitoring of the reading of the plurality of data tiles, determine a second data tile read pattern and, in response, execute a second data tile prefetching algorithm associated with the second data tile read pattern. Reading and prefetching tiles may comprise querying a lookup table to determine a compressed data memory address that is mapped to the linear memory address associated with the data request that emanated from the processing component. Reading and prefetching tiles may also comprise decompression of the tiles.

Data tile read patterns may be, but are not limited to being, one of a horizontal stripe read pattern, a vertical stripe read pattern, a horizontal patch read pattern, a vertical patch read pattern, a randomly-located horizontal patch read pattern, and a randomly-located vertical patch read pattern.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

FIG. 5 illustrates an exemplary intelligent tile-based prefetching methodology according to the solution in response to recognition of a vertical stripe read pattern;

FIG. 6 illustrates an exemplary intelligent tile-based prefetching methodology according to the solution in response to recognition of a horizontal patch read pattern;

DETAILED DESCRIPTION

Figure 1:
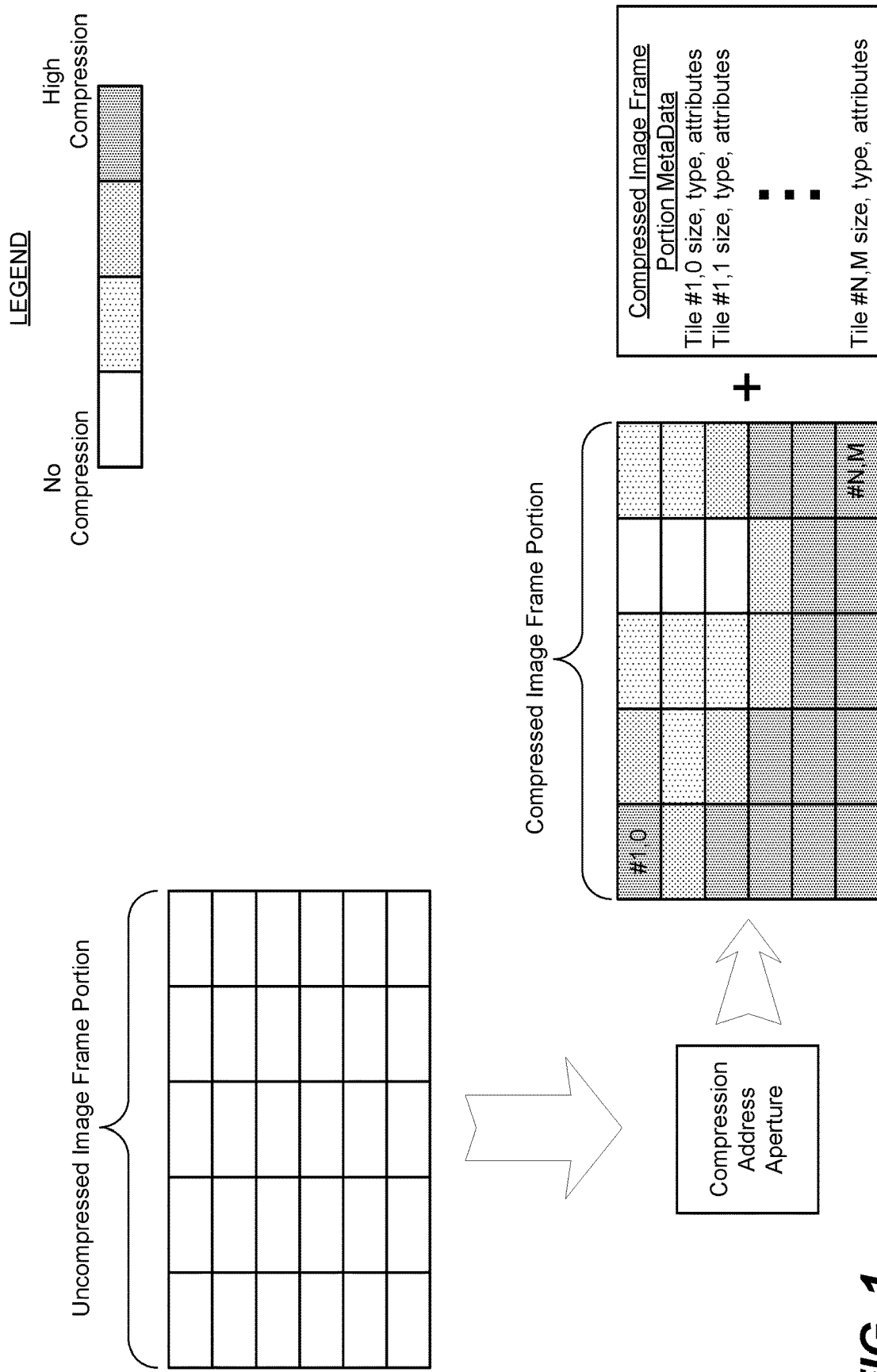
FIG. 1 illustrates the effects of compressing an image frame composed of multiple data sub-units or tiles.

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, reference to "DRAM" or "DDR" memory components will be understood to envision any of a broader class of volatile random access memory ("RAM") and will not limit the scope of the solutions disclosed herein to a specific type or generation of RAM. That is, it will be understood that various embodiments of the systems and methods provide a solution for managing transactions of data that have been compressed, stored and retrieved according to intelligent tile-based prefetching methodologies and are not necessarily limited in application to data transactions associated with double data rate memory. Moreover, it is envisioned that certain embodiments of the solutions disclosed herein may be applicable to DDR, DDR-2, DDR-3, low power DDR ("LPDDR") or any subsequent generation of DRAM.

As used in this description, the terms "component," "database," "module," "block," "system," "aperture," and the like are intended to refer generally to a computer-related entity, either hardware, firmware, a combination of hardware and software, software, or software in execution, unless specifically limited to a certain computer-related entity. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or chip may be comprised of one or more distinct processing components generally referred to herein as "core(s)."

In this description, the terms "engine," "processing engine," "processing component," "processor," "producer" and the like are used to refer to any component within a system on a chip ("SoC") that generates data and/or image frames and transfers them over a bus to, or from, a memory component via a compression address aperture and/or in cooperation with any other functional aperture. As such, an engine may refer to, but is not limited to refer to, a CPU, DSP, GPU, modem, controller, camera, video recorder, etc.

In this description, the term "bus" refers to a collection of wires through which data is transmitted from a processing engine to a memory component or other device located on or off the SoC. It will be understood that a bus consists of two parts—an address bus and a data bus where the data bus transfers actual data and the address bus transfers information specifying location of the data in a memory component (i.e., address and associated metadata). The terms "width" or "bus width" or "bandwidth" refers to an amount of data, i.e. a "chunk size," that may be transmitted per cycle through a given bus. For example, a 16-byte bus may transmit 16 bytes of data at a time, whereas 32-byte bus may transmit 32 bytes of data per cycle. Moreover, "bus speed" refers to the number of times a chunk of data may be transmitted through a given bus each second and, as such, would be understood by one of ordinary skill in the art to relate to "bus capacity." Similarly, a "bus cycle" or "cycle" refers to transmission of one chunk of data through a given bus.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") and fifth generation ("5G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the terms "image," "data set," "data," "frame," "image frame," "buffer," "file" and the like are used interchangeably.

In this description, the terms "tile" and "unit" are used interchangeably to refer to a block of pixels that forms a subset of a larger block of data such as an image frame. A "tile" or "unit," depending upon embodiment of the solution, may exhibit any aspect ratio suitable for the embodiment and, as such, one of ordinary skill in the art will appreciate that a "tile" or "unit" within an image frame is not necessarily limited to having a "square" aspect ratio—I.e., depending upon embodiment a "tile" or "unit" may be rectangular.

In this description, the term "uncompressed" refers to a frame in its original, pre-compression state whereas the term "decompressed" refers to a frame that was first compressed from its uncompressed state via a compression address aperture and then later decompressed by the aperture in service to a read request from a processor. Depending on the class of compression used, the data set of a decompressed frame may be identical to the data set of the frame's original, uncompressed state (lossless compression) or it may not (lossy compression), as would be understood by one of ordinary skill in the art.

As one of ordinary skill in the art would understand and appreciate, an address aperture component provides access to a memory region through an alternate address range. Typically, an address aperture leverages a simple mapping between the addresses it uses ("aperture addresses") and the original addresses used by a processor ("alias addresses") for the same physical memory locations. A functional address aperture is an address aperture that additionally performs some function on the data as it passes through the aperture from the processor to the memory component. Example functions that may be provided by a functional address aperture include, but are not limited to, encryption, compression and error correction.

Functional address apertures, by virtue of compressing and/or manipulating the data, may introduce a relatively complex mapping between data in the aperture domain versus data in the alias domain. That is, address mapping between the domains may not be 1:1—an address region in the aperture space may correspond to a smaller or larger region in the aliased address space (as might be expected, for example, in the case of a functional address aperture implementing compression). As one of ordinary skill in the art would appreciate, a single data access in the aperture space may correspond to zero, one, or multiple accesses in the aliased space (perhaps even to non-contiguous memory ranges). Moreover, the functional address aperture may leverage a cache such that accesses in the aperture space are delayed or coalesced, as the need may be.

It is envisioned that a functional address aperture may be configured and leveraged to implement a tile-aware compression function such that data written to memory through the aperture may be compressed in view of the tile-based organization of the memory component (such as the DDR). The benefit of such a functional address aperture is that memory bandwidth compression and tile management in the memory component may be accomplished without the producing processor being sensitive to compression function and tile size. Such a functional address aperture may be configured to map a linear-addressed aperture address region to a tile-addressed alias address region for one or more buffers, accommodate partial-tile read requests, and cache any remaining tile data for later reads (thereby mitigating over-fetch of tiles from the memory). Similarly, such a functional address aperture may be configured to cache write data and/or collect and assemble partial tile writes into complete tiles for efficient compression.

As mentioned above, it is envisioned that a tile-aware cache in a compression address aperture may mitigate over-fetch and, in so doing, mitigate unnecessary consumption of memory bandwidth. Notably, however, a compression address aperture may suffer from excessive memory latency in accommodating a read request of a partial-tile read request to a tile not presently in the tile-aware cache. The reason for the excessive memory latency in such a data request scenario is because the compression address aperture may have to 1) fetch a programmable lookup data structure from memory in order to determine the associated buffer/tile mapping for the request, 2) check the tile-aware cache to make sure that the identified frame/tiles are not in the cache already, 3) fetch the identified frame/tiles from compressed memory, and 4) decompress the compressed frame/tiles. Once the tiles are fetched, any subsequent reads to the data stored in those tiles will be serviced by the aperture with relatively low latency, as the tiles would already be in the tile-aware cache (thereby avoiding step 3 and possibly step 4 as described above). A more detailed explanation of the latency that may be experienced by a compression address aperture seeking to make a partial-tile read is provided below relative to FIG. 2.

As one of ordinary skill in the art would understand, prefetching tiles in anticipation of processor read requests may work to increase the possibility that a needed tile is in the tile-aware cache of the compression address aperture when a partial-tile read request is received and serviced. However, in the case of a tile-unaware processor seeking to prefetch data through a compression address aperture, the processor's prefetch efforts will not resolve the latency problem because it is unaware of the tile structure.

And so, embodiments of the solution for intelligent tile-based prefetching extend prefetching by a compression address aperture to include detection of intra-tile access patterns from sub-tile accesses. As will be better understood from the description and figures that follow, embodiments of the solution trigger intelligent prefetching methods in view of intra-tile access patterns. Logic residing in and with a tile manager component of the compression address aperture monitors and recognizes the patterns on a per-buffer basis and, if/when a matching pattern is recognized, an associated prefetching method for tiles is triggered. Advantageously, once an intra-tile pattern based on sub-tile accesses is recognized, a prefetch method according to the solution may be implemented to minimize access latency even though no effort or awareness of tile structure is harbored by the requesting processor.

Turning to FIG. 1, illustrated are the effects of compressing an image frame composed of multiple data sub-units or tiles. In this description, the various embodiments may be described within the context of an image frame, or portion of an image frame, made up of 256-byte tiles. Notably, however, it will be understood that the 256-byte tile sizes, as well as the various compressed data transaction sizes, are exemplary in nature and do not suggest that embodiments of the solution are limited in application to 256-byte tile sizes. Moreover, it will be understood that reference to any specific minimum access length ("MAL") or access block size ("ABS") for a DRAM in this description is being used for the convenience of describing the solution and does not suggest that embodiments of the solution are limited in application to a DRAM device having a particular MAL requirement. As such, one of ordinary skill in the art will recognize that the particular data transfer sizes, chunk sizes, bus widths, MALs, etc. that may be referred to in this description are offered for exemplary purposes only and do not limit the scope of the envisioned solutions as being applicable to applications having the same data transfer sizes, chunk sizes, bus widths, MALs, etc.

Returning to the FIG. 1 illustration, a portion of an uncompressed image frame (aka, a "buffer") is depicted as being comprised of thirty uncompressed tiles or units, each of a size "X" as represented by a lack of shading. An exemplary size X may be 256 bytes, however, as explained above, a tile is not limited to any certain size and may vary according to application. For ease of illustration and description, the thirty tile portion of the larger uncompressed image frame is depicted as representative of the entire image frame. As would be understood by one of ordinary skill in the art, the uncompressed image frame may be reduced in size, thereby optimizing its transfer over a bus, reducing overall system power consumption and minimizing its impact on memory capacity, by a compressor block (depicted in FIG. 3 as Image CODEC Module 114) in a compression address aperture that applies a compression algorithm on a tile by tile basis. The result of the compression is a compressed image frame plus a metadata file, as can be seen in the FIG. 1 illustration relative to the illustrated portion of the frame. The compressed image frame is comprised of the tiles in the original, uncompressed image frame after having been subjected to a compression algorithm by the compression block 114.

In the uncompressed image frame, each tile may be of a size X, whereas in the compressed image frame each tile may be of a size X or less (X for no compression possible, X−1 bytes, X−2 bytes, X−3 bytes, . . . , X=1 byte). In the illustration, the various tiles that form the compressed image frame are represented by differing levels of shading depending on the extent of compression that resulted from the compression block 114 having applied its compression algorithm to the data held by the given tile. Notably, the compression block 114 creates a companion buffer for a compressed image frame metadata, as would be understood by one of ordinary skill in the art. The compressed image frame metadata contains a record of the size, type and attributes for each compressed tile in the compressed image frame. Because DRAM access may be limited to units of the minimum access length MAL, the size of a given compressed tile may be represented in the metadata as the number of ABSs required to represent the compressed tile size (e.g., 1 MAL, 2 MAL, . . . n MAL). This size description in the metadata allows a future reader of the buffer to ask the memory for only the minimum required amount of data needed to decompress each tile back to the original size X.

Figure 2:
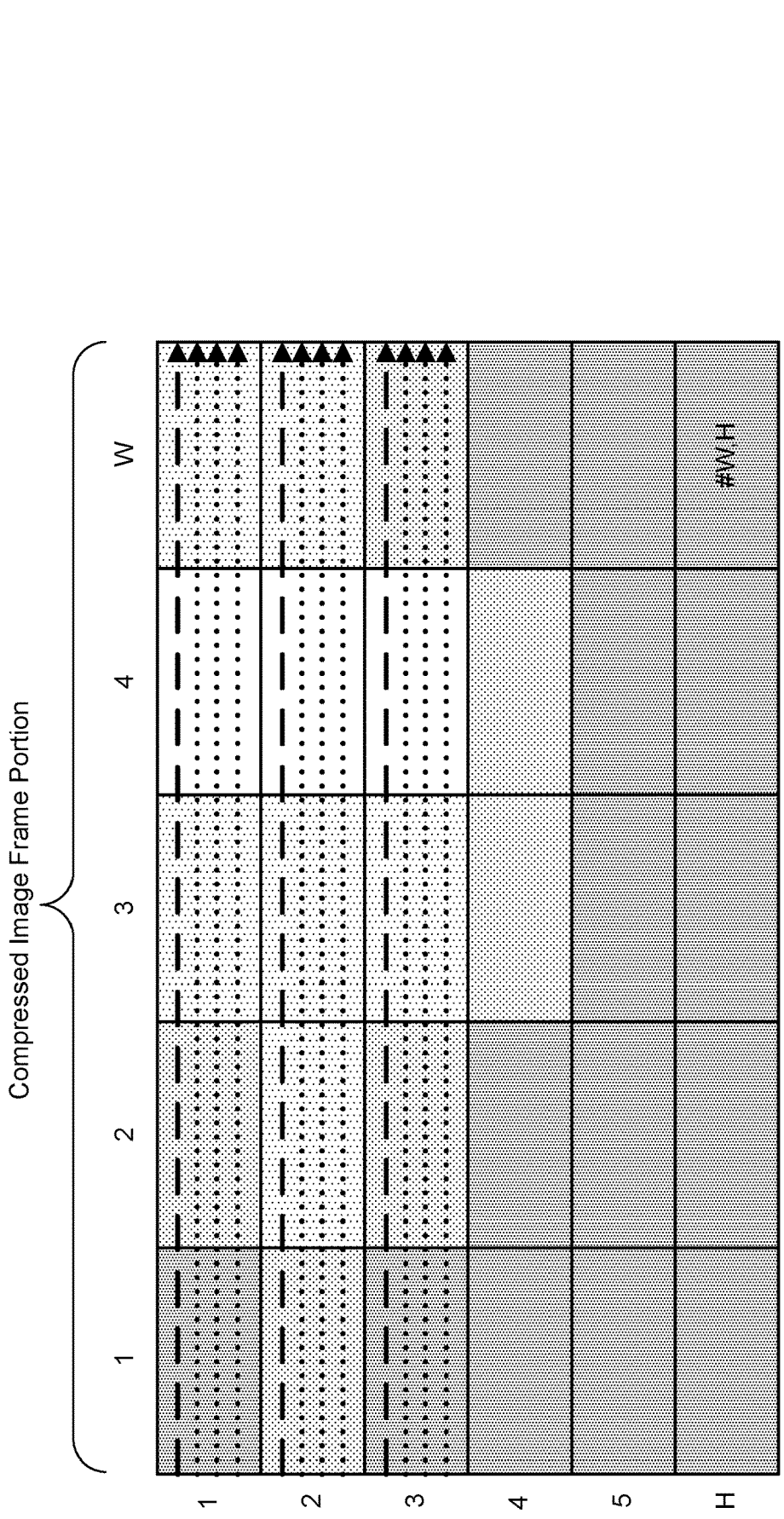
FIG. 2 illustrates a portion of a compressed image frame comprised of tiles and the relative latencies associated with reading data lines that each traverse a series of the tiles.

FIG. 2 illustrates a portion of a compressed image frame comprised of tiles and the relative latencies associated with reading data lines that each traverse a series of the tiles. The exemplary compressed image frame portion is organized into a grid of compressed tiles having W columns and H rows. As a way of illustration, assuming a 4×4 pixel size for each tile, a processor executing a naïve raster-order access across the frame will generate a high memory latency for one whole line (e.g., dash arrow traversing the columns from tile #1,#1 to tile # W,#1), followed by lower memory latency for reads of the three subsequent lines from the same series of tiles (e.g., dotted arrows traversing the columns from tile #1,#1 to tile # W,#1). The reason for the lower memory latency for the subsequent line reads is because the tiles would have been saved in cache as a result of having been previously retrieved from memory in order to accommodate the first line read. The pattern repeats with linear reads of data tiles #1,#2 to tile # W,#2, tiles #1,#3 to tile # W,#3, etc. Advantageously, and as will be better understood from the following description and figures, embodiments of the solution reduce the first-access latency and, thereby, lower overall latency as well as generate a more consistent latency among reads.

Turning now to the remaining figures, embodiments of the solution are described. As will become evident from the following figures and the related description, compressed image frames sub-divided into tiles may be intelligently prefetched in response to linear access requests such that tiles are present in a tile-aware cache of a compressed address aperture when needed to service a later access request. Embodiments of the solution monitor sub-tile accesses to recognize certain predefined patterns of tile accesses and, when recognized, employ an associated prefetch algorithm for the tiles. In this way, embodiments of the solution mitigate or avoid long latency times for servicing partial-tile reads from tile-unaware processors without risking significant overfetch of tiles.

Figure 3:
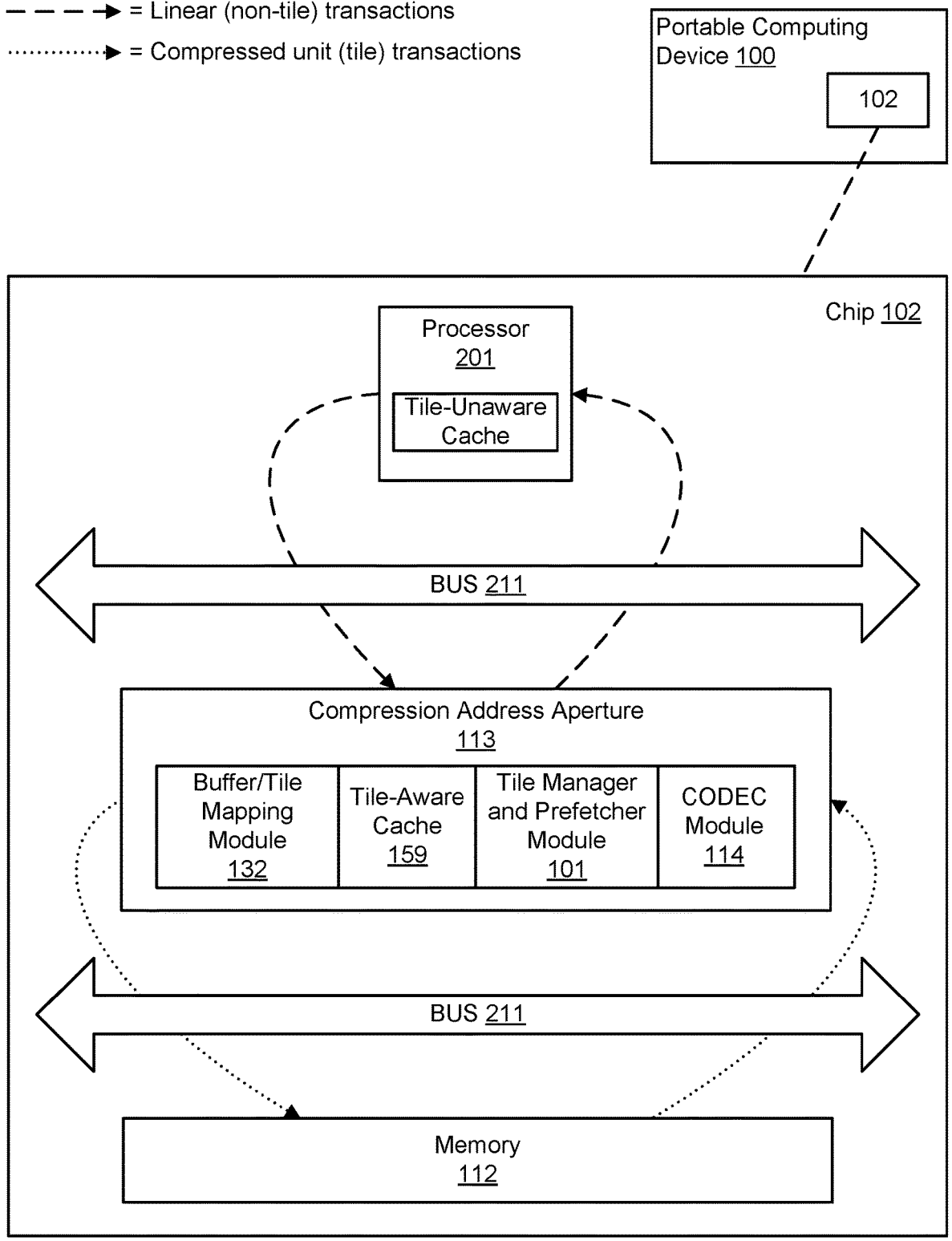
FIG. 3 is a functional block diagram illustrating an exemplary embodiment of an on-chip system configured for intelligent tile-based prefetching according to the solution.

FIG. 3 is a functional block diagram illustrating an exemplary embodiment of an on-chip system 102 configured for intelligent tile-based prefetching according to the solution. As can be understood from the FIG. 3 illustration, a processor 201 and a compression address aperture 113 communicate with each other and a memory component 112 over a bus 211. The processor 201 is associated with a tile-unaware cache and, as such, may make data requests from memory 112 using a linear (non-tile) address provided to compression address aperture 113. The compression address aperture 113 may utilize a buffer/tile mapping module 132 in order to access a lookup table (lookup table not depicted in the FIG. 3 illustration and may reside in memory 112 or some other memory component residing on or off chip 102). Using the lookup table, the buffer/tile mapping module 132 of the aperture 113 may determine the aperture address that maps to the linear address provided by the processor 201. With the aperture address determined, the compression address aperture 113 may query memory 112 to retrieve the requested data in its compressed form. It is envisioned that the mapping of the linear address to the tile-based address of the buffer may be accomplished any number of ways including, but not necessarily limited to, using a limited number of pre-programmable address range check registers in the compression address aperture that define the linear address to tile-based buffer lookup table, using a programmable lookup data structure stored in DRAM or cache and fetched on-demand, and/or using a direct encoding of the buffer index and X/Y offset into the linear address by leveraging the X/Y aperture concept.

Notably, the compressed data may be stored in memory 112 across a series of tiles and, as such, to return the linear data requested by the processor 201 the aperture 113 may be required to make partial reads of multiple tiles in memory 112. As explained above, when partial reads of multiple tiles are required in order to service a linear data request, the first line of data may experience a relatively high latency as multiple tiles must be retrieved from memory 112 into tile-aware cache 159 and decompressed by codec 114 before the line of data may be returned to the processor 201. To reduce the latency associated with acquiring the first line of data that traverses across multiple tiles of memory 112, the aperture 113 may employ one or more prefetching algorithms such as, but not limited to, those provided and described below.

Returning to the FIG. 3 illustration, the tile manager and prefetcher module ("TMP module") 101 may begin fetching of compressed tiles that contain the linear data requested by processor 201. The fetched compressed tiles may be decompressed by codec 114 and stored in tile-aware cache 159 in their decompressed state or, optionally depending on embodiment of the solution, may be stored in tile-aware cache 159 in their compressed state and later decompressed by codec 114. Regardless, once decompressed, the partial reads of the tiles may be aggregated and returned to processor 201 in response to the linear request made by the processor 201. In this way, even though the processor 201 is unaware of the tile-based organization of the compressed image in memory 112, the compression address aperture 113 may service a linear address request from processor 201.

Advantageously, as the processor 201 continues to make linear data requests, and the compression address aperture 113 continues to respond to the requests as described above, the TMP module 101 may also monitor the data request pattern emanating from the processor 201. As the data requests are received and serviced by the aperture 113, the TMP module 101 may compare the pattern of retrieved compressed tiles to predefined patterns and, if a match is determined, the TMP module 101 may execute an intelligent tile-based prefetching methodology/algorithm associated with the predefined pattern. In this way, the TMP module 101 may advantageously anticipate the need for certain compressed tiles to service future linear data requests from the processor 201 and, in so doing, mitigate or lower the average latency to service the data requests while reducing unnecessary burden on memory and bus bandwidth that could result from unnecessary prefetches.

The TMP module 101 may continue the given intelligent tile-based prefetching algorithm unless and until it is determined that the request pattern emanating from the processor 201 no longer matches the identified predefined pattern. In such case, the TMP module 101 may discontinue the intelligent tile-based prefetching algorithm while continuing to monitor the request pattern from processor 201 in an effort to identify a match to another predefined pattern or a return to the previously identified predefined pattern, as the case may be.

Figure 4:
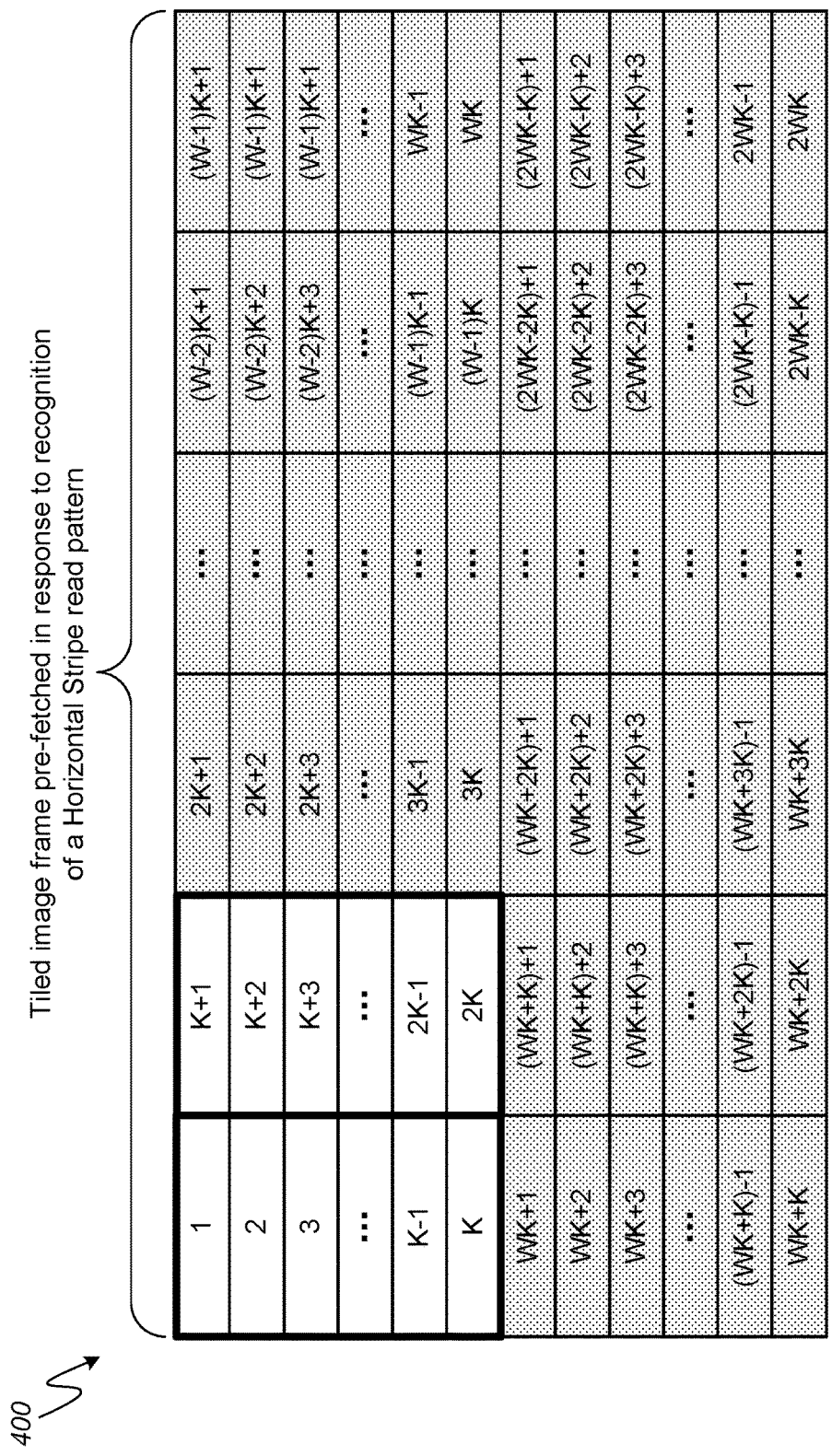
FIG. 4 illustrates an exemplary intelligent tile-based prefetching methodology according to the solution in response to recognition of a horizontal stripe read pattern.

FIG. 4 illustrates an exemplary intelligent tile-based prefetching methodology according to the solution in response to recognition of a horizontal stripe read pattern. Illustrated is a portion 400 of a compressed image, divided into tiles, such as may be stored in memory 112. The compressed image portion 400 is of a total size of 2WK tiles, where each tile is of a certain amount of pixels in width and a certain amount of pixels in height. As can be understood from the illustration, the image portion 400 has "W" columns of tiles, hence a total depiction of 2WK tiles where the "K" variable represents a certain quantity.

Briefly referring back to the FIG. 3 description, in response to a read request from the processor 201, the compression address aperture 113 may query a lookup table for the appropriate aperture address and begin reading compressed tiles from the memory 112 accordingly. In such a scenario, the first compressed tile read may be tile "1" in the compressed image portion 400. The second tile read may be tile "2" and next tile "3". The read pattern may continue in this manner, reading the compressed tiles sequentially in a column until tile "K" is read, after which the pattern may dictate that the next tile to be read is tile "K+1." The pattern may continue from tile "K+1", reading sequential tiles in the column until tile "2K" is read.

As previously described, the TMP module 101 may be monitoring the read pattern just described and recognize that two adjacent columns of tiles (as boldly outlined in the illustration), each of a height equal to "K" tiles, have been read in response to the data request from processor 201. Recognizing that the read request pattern is generating a "horizontal stripe" of height "K" across the image frame, the TMP module 101 may trigger execution of an intelligent prefetching algorithm that prefetches tiles according to the anticipated pattern. As such, the TMP module 101 may prefetch tiles along a pattern that sequentially includes tiles "2K+1" through "3K", then so on to tiles "(W−1)K+1" through "WK", then so on to tiles "WK+1" through "WK+K". The prefetch pattern may continue in this manner until a subsequent read request from processor 201 indicates that the prefetch algorithm is no longer optimal, at which point the TMP module 101 may discontinue prefetching subject to the prefetch pattern just described and continue monitoring in an effort to recognize a new request pattern associated with a predefined prefetch algorithm.

Notably, it is envisioned that embodiments of the solution may not abandon an actively employed prefetching algorithm upon recognition of the first access request that isn't consistent with the anticipated read pattern. That is, depending on embodiment, a seemingly spurious access request may not trigger discontinuation of one prefetching algorithm in favor of another algorithm or no algorithm. As a non-limiting example, certain embodiments of the solution may leverage a shift register of length "n" and with a reset value of 0. For each access to the buffer that abides by the actively employed prefetching algorithm, a '0' may be shifted in, as would be understood by one of ordinary skill in the art of shift registers, while a '1' may be shifted in for each access to the buffer that does not abide by the actively employed prefetching algorithm. In this way, or in a comparable way, certain embodiments of the solution may only trigger discontinuation of an active prefetching algorithm in the event that the number of '1s' in the shift register exceeds a programmable threshold.

Described differently, the TMP module 101 may monitor the fetch of tiles in response to a read request pattern from processor 201 and, if any portion of a vertically-sequential tile is read, continue its effort to match the read request pattern to a predefined horizontal stripe read pattern. So long as the read request pattern emanating from processor 201 continues to request vertically sequential tiles, the TMP module 101 may keep count of the number of vertically sequential tiles read. If/when any portion of a non-vertically sequential tile is read, and the non-vertically sequential tile is in a second column adjacent to the first column that contained the previously read tile, the TMP module 101 may estimate that the value of "K" in the horizontal stripe read pattern is value "K_1" where the value "K_1" is equal to the number of vertically sequential tiles read in the first column. At that point, with the read request pattern emanating from processor 201 continuing to request vertically sequential tiles in the second column, the TMP module 101 may keep count of the number of vertically sequential tiles read from the second column until any portion of a non-vertically sequential tile is read from a third column. At that point, the TMP module 101 may estimate that the value of "K" in the horizontal stripe read pattern is value "K_2" where the value "K_2" is equal to the number of vertically sequential tiles read in the second column. The TMP module 101 may then compare the "K_1" value to the "K_2" value (i.e., compare the number of vertically sequential tiles read from the first column to the number of vertically sequential tiles read from the second column) and, if "K_1" is determined to equal "K_2", the TMP module 101 may anticipate the continuance of a horizontal stripe read pattern across the image and, in response, trigger execution of an intelligent prefetching pattern that reads tiles in sequential columns of "K" height (i.e., a height equal to the values of "K_1" and "K_2") in a left to right pattern across the image, as suggested in the FIG. 4 illustration. Notably, if values "K_1" and "K_2" do not equal when compared, the TMP module 101 may conclude that a predefined horizontal stripe read pattern is not being followed by the processor 201 and, accordingly, may not trigger execution of the associated intelligent prefetching pattern.

Although prefetching according to an algorithm associated with a horizontal stripe read pattern, the TMP module 101 may continue to monitor the actual tiles needed to service the ongoing read requests from processor 201 and if, at any point, any portion of an unexpected tile is accessed the TMP module 101 may cause the prefetching algorithm to be discontinued.

Once the TMP module 101 triggers execution of a prefetching algorithm associated with a horizontal stripe read pattern, tiles may be prefetched according to the pattern in a group of "T" tiles as set by a programmable tuning parameter "T". When prefetching of a group of "T" tiles is complete, and whenever a new read request is received, the tile that is "T" tiles ahead in the pattern of the last-requested tile may be prefetched. In this way, the compression address aperture 113 executing an intelligent tile-based prefetching algorithm in response to recognition of a horizontal stripe read pattern, may ensure that the next "T" tiles anticipated to be needed to service read requests from processor 201 are in the tile-aware cache and available for low-latency response to the read requests.

Notably, although this exemplary embodiment of the solution illustrated by FIG. 4 has been described within the context of a read request pattern emanating from the processor, it is envisioned that a similar embodiment may employ a horizontal stripe prefetching in response to recognition that the processor has generated partial tile writes to tiles associated with a horizontal stripe pattern. In such a scenario, the TMP module 101 may prefetch the full tiles from the memory so that the necessary remainder data is available in cache to complete a full tile write when the processor generates additional partial-tile writes according to the predicted pattern. In this way, embodiments of the solution may avoid the high latency penalty of waiting to confirm that only a partial tile will be written—rather, as soon as a partial-tile write is stored in cache, the remainder data in the tile may be already available in the cache and aggregated with the partial tile to generate a full tile write.

As another example, embodiments of the solution configured to prefetch tiles from memory in response to recognizing a partial-tile write pattern may use a shift register to determine when to discontinue prefetching full tiles in anticipation of accommodating partial-tile write transactions. In such an embodiment, a shift register of length "n" and with a reset value of 0 may be employed. For each partial-tile write that abides by the actively employed prefetching algorithm, a '0' may be shifted in, as would be understood by one of ordinary skill in the art of shift registers, while a '1' may be shifted in for each partial-tile write that does not abide by the actively employed prefetching algorithm. In this way, or in a comparable way, certain embodiments of the solution may only trigger discontinuation of an active prefetching algorithm for accommodation of partial-tile writes in the event that the number of '1s' in the shift register exceeds a programmable threshold.

FIG. 5 illustrates an exemplary intelligent tile-based prefetching methodology according to the solution in response to recognition of a vertical stripe read pattern. Illustrated is a portion 500 of a compressed image, divided into tiles, such as may be stored in memory 112. The compressed image portion 500 is of a total size of 2HK tiles, where each tile is of a certain amount of pixels in width and a certain amount of pixels in height. As can be understood from the illustration, the image portion 500 has "H" rows of tiles, hence a total depiction of 2HK tiles where the "K" variable represents a certain quantity.

Briefly referring back to the FIG. 3 description, in response to a read request from the processor 201, the compression address aperture 113 may query a lookup table for the appropriate aperture address and begin reading compressed tiles from the memory 112 accordingly. In such a scenario, the first compressed tile read may be tile "1" in the compressed image portion 500. The second tile read may be tile "2" and next tile "3". The read pattern may continue in this manner, reading the compressed tiles sequentially in a row until tile "K" is read, after which the pattern may dictate that the next tile to be read is tile "K+1." The pattern may continue from tile "K+1", reading sequential tiles in the row until tile "2K" is read.

As previously described, the TMP module 101 may be monitoring the read pattern just described and recognize that two adjacent rows of tiles (as boldly outlined in the illustration), each of a length equal to "K" tiles, have been read in response to the data request from processor 201. Recognizing that the read request pattern is generating a "vertical stripe" of width "K" down the image frame, the TMP module 101 may trigger execution of an intelligent prefetching algorithm that prefetches tiles according to the anticipated pattern. As such, the TMP module 101 may prefetch tiles along a pattern that sequentially includes tiles "2K+1" through "3K", then so on to tiles "2K+1" through "3K", then so on to tiles "1(H−1)K+1" through "HK". The prefetch pattern may continue in this manner until a subsequent read request from processor 201 indicates that the prefetch algorithm is no longer optimal, at which point the TMP module 101 may discontinue prefetching subject to the prefetch pattern just described and continue monitoring in an effort to recognize a new request pattern associated with a predefined prefetch algorithm.

Notably, it is envisioned that embodiments of the solution may not abandon an actively employed prefetching algorithm upon recognition of the first access request that isn't consistent with the anticipated read pattern. That is, depending on embodiment, a seemingly spurious access request may not trigger discontinuation of one prefetching algorithm in favor of another algorithm or no algorithm. As a non-limiting example, certain embodiments of the solution may leverage a shift register of length "n" and with a reset value of 0. For each access to the buffer that abides by the actively employed prefetching algorithm, a '0' may be shifted in, as would be understood by one of ordinary skill in the art of shift registers, while a '1' may be shifted in for each access to the buffer that does not abide by the actively employed prefetching algorithm. In this way, or in a comparable way, certain embodiments of the solution may only trigger discontinuation of an active prefetching algorithm in the event that the number of '1s' in the shift register exceeds a programmable threshold.

Described differently, the TMP module 101 may monitor the fetch of tiles in response to a read request pattern from processor 201 and, if any portion of a horizontally-sequential tile is read, continue its effort to match the read request pattern to a predefined vertical stripe read pattern. So long as the read request pattern emanating from processor 201 continues to request horizontally sequential tiles, the TMP module 101 may keep count of the number of horizontally sequential tiles read. If/when any portion of a non-horizontal sequential tile is read, and the non-horizontal sequential tile is in a second row adjacent to the first row that contained the previously read tile, the TMP module 101 may estimate that the value of "K" in the vertical stripe read pattern is value "K_1" where the value "K_1" is equal to the number of horizontally sequential tiles read in the first row. At that point, with the read request pattern emanating from processor 201 continuing to request horizontally sequential tiles in the second row, the TMP module 101 may keep count of the number of horizontally sequential tiles read from the second row until any portion of a non-horizontally sequential tile is read from a third row. At that point, the TMP module 101 may estimate that the value of "K" in the vertical stripe read pattern is value "K_2" where the value "K_2" is equal to the number of horizontally sequential tiles read in the second row. The TMP module 101 may then compare the "K_1" value to the "K_2" value (i.e., compare the number of horizontally sequential tiles read from the first row to the number of horizontally sequential tiles read from the second row) and, if "K_1" is determined to equal "K_2", the TMP module 101 may anticipate the continuance of a vertical stripe read pattern down the image and, in response, trigger execution of an intelligent prefetching pattern that reads tiles in sequential rows of "K" length (i.e., a length equal to the values of "K_1" and "K_2") in an upper to lower pattern across the image, as suggested in the FIG. 5 illustration. Notably, if values "K_1" and "K_2" do not equal when compared, the TMP module 101 may conclude that a predefined vertical stripe read pattern is not being followed by the processor 201 and, accordingly, may not trigger execution of the associated intelligent prefetching pattern.

Although prefetching according to an algorithm associated with a vertical stripe read pattern, the TMP module 101 may continue to monitor the actual tiles needed to service the ongoing read requests from processor 201 and if, at any point, any portion of an unexpected tile is accessed the TMP module 101 may cause the prefetching algorithm to be discontinued.

Once the TMP module 101 triggers execution of a prefetching algorithm associated with a vertical stripe read pattern, tiles may be prefetched according to the pattern in a group of "T" tiles as set by a programmable tuning parameter "T". When prefetching of a group of "T" tiles is complete, and whenever a new read request is received, the tile that is "T" tiles ahead in the pattern of the last-requested tile may be prefetched. In this way, the compression address aperture 113 executing an intelligent tile-based prefetching algorithm in response to recognition of a vertical stripe read pattern, may ensure that the next "T" tiles anticipated to be needed to service read requests from processor 201 are in the tile-aware cache and available for low-latency response to the read requests.

Notably, although this exemplary embodiment of the solution illustrated by FIG. 5 has been described within the context of a read request pattern emanating from the processor, it is envisioned that a similar embodiment may employ a vertical stripe prefetching in response to recognition that the processor has generated partial tile writes to tiles associated with a vertical stripe pattern. In such a scenario, the TMP module 101 may prefetch the full tiles from the memory so that the necessary remainder data is available in cache to complete a full tile write when the processor generates additional partial-tile writes according to the predicted pattern. In this way, embodiments of the solution may avoid the high latency penalty of waiting to confirm that only a partial tile will be written—rather, as soon as a partial-tile write is stored in cache, the remainder data in the tile may be already available in the cache and aggregated with the partial tile to generate a full tile write.

As another example, embodiments of the solution configured to prefetch tiles from memory in response to recognizing a partial-tile write pattern may use a shift register to determine when to discontinue prefetching full tiles in anticipation of accommodating partial-tile write transactions. In such an embodiment, a shift register of length "n" and with a reset value of 0 may be employed. For each partial-tile write that abides by the actively employed prefetching algorithm, a '0' may be shifted in, as would be understood by one of ordinary skill in the art of shift registers, while a '1' may be shifted in for each partial-tile write that does not abide by the actively employed prefetching algorithm. In this way, or in a comparable way, certain embodiments of the solution may only trigger discontinuation of an active prefetching algorithm for accommodation of partial-tile writes in the event that the number of '1s' in the shift register exceeds a programmable threshold.

FIG. 6 illustrates an exemplary intelligent tile-based prefetching methodology according to the solution in response to recognition of a horizontal patch read pattern. Illustrated is a portion 600 of a compressed image, divided into tiles, such as may be stored in memory 112. The compressed image portion 600 is of a total size of 6HK tiles, where each tile is of a certain amount of pixels in width and a certain amount of pixels in height. As can be understood from the illustration, the image portion 600 has six blocks or patches of tiles each containing "H" rows of tiles, hence a total depiction of 6HK tiles where the "K" variable represents a certain quantity.

Briefly referring back to the FIG. 3 description, in response to a read request from the processor 201, the compression address aperture 113 may query a lookup table for the appropriate aperture address and begin reading compressed tiles from the memory 112 accordingly. In such a scenario, the first compressed tile read may be tile "1" in the compressed image portion 600. The second tile read may be tile "2" and next tile "3". The read pattern may continue in this manner, reading the compressed tiles sequentially in a row until tile "K" is read, after which the pattern may dictate that the next tile to be read is tile "K+1." The pattern may continue from tile "K+1", reading sequential tiles in the rows of the first patch until tile "HK" is read. Then the pattern may continue from tile "HK" to read tile "HK+1", reading sequential tiles in the rows of the second patch until tile "2HK" is read. At this point, the TMP module 101 may recognize the horizontal patch read pattern and begin prefetching as described in more detail below.

As previously described, the TMP module 101 may be monitoring the read pattern just described and recognize that two adjacent patches of tiles (as boldly outlined in the illustration), each of a length equal to "K" tiles and a height equal to "H" rows, have been read in response to the data request from processor 201. Recognizing that the read request pattern is generating a "horizontal patch" of "K×H" across the image frame, the TMP module 101 may trigger execution of an intelligent prefetching algorithm that prefetches tiles according to the anticipated pattern. The prefetch pattern may continue until a subsequent read request from processor 201 indicates that the prefetch algorithm is no longer optimal, at which point the TMP module 101 may discontinue prefetching subject to the prefetch pattern just described and continue monitoring in an effort to recognize a new request pattern associated with a predefined prefetch algorithm.

Notably, it is envisioned that embodiments of the solution may not abandon an actively employed prefetching algorithm upon recognition of the first access request that isn't consistent with the anticipated read pattern. That is, depending on embodiment, a seemingly spurious access request may not trigger discontinuation of one prefetching algorithm in favor of another algorithm or no algorithm. As a non-limiting example, certain embodiments of the solution may leverage a shift register of length "n" and with a reset value of 0. For each access to the buffer that abides by the actively employed prefetching algorithm, a '0' may be shifted in, as would be understood by one of ordinary skill in the art of shift registers, while a '1' may be shifted in for each access to the buffer that does not abide by the actively employed prefetching algorithm. In this way, or in a comparable way, certain embodiments of the solution may only trigger discontinuation of an active prefetching algorithm in the event that the number of '1s' in the shift register exceeds a programmable threshold.

Described differently, the TMP module 101 may monitor the fetch of tiles in response to a read request pattern from processor 201 and, if any portion of a horizontally-sequential tile is read, continue its effort to match the read request pattern to a predefined horizontal patch read pattern by incrementing an estimation of "K" to value "K_1". If/when any portion of a non-horizontally sequential tile is read, and the non-horizontally sequential tile is in a second row adjacent to the first row that contained the previously read tile, set "K" estimation to "K_1" and begin to increment value "K_2" in association with tile reads from the second row. Also, increment an estimation of "H" to value "H_1". So long as any portion of a horizontally-sequential tile is read from the second row, the TMP module 101 may continue matching the read request pattern to a predefined horizontal patch read pattern by incrementing "K_2". The matching algorithm continues in this manner, incrementing "H_1" with each new row of tiles read, so long as "K" for a given row equals "K" for the previous row.

If/when any portion of a non-horizontally sequential tile is read, and the non-horizontal sequential tile is adjacent to previously read tile "K" (i.e, tile "HK+1"), the TMP module 101 may increment H_2 and continue its effort to match the read request pattern to a predefined horizontal patch read pattern by incrementing an estimation of "K'" to value "K'_1". If/when any portion of a non-horizontally sequential tile is read, and the non-horizontally sequential tile is in a second row adjacent to the first row that contained the previously read tile, and "K'" equals "K", set "K'" estimation to "K'_1" and begin to increment value "K'_2" in association with tile reads from the second row. Also, increment an estimation of "H" to value "H_2". So long as any portion of a horizontally-sequential tile is read from the second row, the TMP module 101 may continue matching the read request pattern to a predefined horizontal patch read pattern by incrementing "K'_2". The matching algorithm continues in this manner, incrementing "H_2" with each new row of tiles read, so long as "K" for a given row equals "K" for the previous row.

If/when any portion of a non-horizontally sequential tile is read, and the non-horizontal sequential tile is adjacent to previously read tile "HK+K" (i.e, tile "2HK+1"), and "H_1" is determined to equal "H_2", the TMP module 101 may anticipate the continuance of a horizontal patch read pattern across the image and, in response, trigger execution of an intelligent prefetching pattern that reads tiles in sequential patches of size "K×H" across the image, as suggested in the FIG. 6 illustration.

Although prefetching according to an algorithm associated with a horizontal patch read pattern, the TMP module 101 may continue to monitor the actual tiles needed to service the ongoing read requests from processor 201 and if, at any point, any portion of an unexpected tile is accessed the TMP module 101 may cause the prefetching algorithm to be discontinued.

Once the TMP module 101 triggers execution of a prefetching algorithm associated with a horizontal patch read pattern, tiles may be prefetched according to the pattern in a group of "T" tiles as set by a programmable tuning parameter "T". When prefetching of a group of "T" tiles is complete, and whenever a new read request is received, the tile that is "T" tiles ahead in the pattern of the last-requested tile may be prefetched. In this way, the compression address aperture 113 executing an intelligent tile-based prefetching algorithm in response to recognition of a horizontal patch read pattern, may ensure that the next "T" tiles anticipated to be needed to service read requests from processor 201 are in the tile-aware cache and available for low-latency response to the read requests.

Notably, although this exemplary embodiment of the solution illustrated by FIG. 6 has been described within the context of a read request pattern emanating from the processor, it is envisioned that a similar embodiment may employ a horizontal patch prefetching in response to recognition that the processor has generated partial tile writes to tiles associated with a horizontal patch pattern. In such a scenario, the TMP module 101 may prefetch the full tiles from the memory so that the necessary remainder data is available in cache to complete a full tile write when the processor generates additional partial-tile writes according to the predicted pattern. In this way, embodiments of the solution may avoid the high latency penalty of waiting to confirm that only a partial tile will be written—rather, as soon as a partial-tile write is stored in cache, the remainder data in the tile may be already available in the cache and aggregated with the partial tile to generate a full tile write.

As another example, embodiments of the solution configured to prefetch tiles from memory in response to recognizing a partial-tile write pattern may use a shift register to determine when to discontinue prefetching full tiles in anticipation of accommodating partial-tile write transactions. In such an embodiment, a shift register of length "n" and with a reset value of 0 may be employed. For each partial-tile write that abides by the actively employed prefetching algorithm, a '0' may be shifted in, as would be understood by one of ordinary skill in the art of shift registers, while a '1' may be shifted in for each partial-tile write that does not abide by the actively employed prefetching algorithm. In this way, or in a comparable way, certain embodiments of the solution may only trigger discontinuation of an active prefetching algorithm for accommodation of partial-tile writes in the event that the number of '1s' in the shift register exceeds a programmable threshold.

Figure 7:
FIG. 7 illustrates an exemplary intelligent tile-based prefetching methodology according to the solution in response to recognition of a vertical patch read pattern.

FIG. 7 illustrates an exemplary intelligent tile-based prefetching methodology according to the solution in response to recognition of a vertical patch read pattern. Illustrated is a portion 700 of a compressed image, divided into tiles, such as may be stored in memory 112. The compressed image portion 700 is of a total size of 5WK tiles, where each tile is of a certain amount of pixels in width and a certain amount of pixels in height. As can be understood from the illustration, the image portion 700 has five blocks or patches of tiles each containing "W" columns of tiles, hence a total depiction of 5WK tiles where the "K" variable represents a certain quantity.

Briefly referring back to the FIG. 3 description, in response to a read request from the processor 201, the compression address aperture 113 may query a lookup table for the appropriate aperture address and begin reading compressed tiles from the memory 112 accordingly. In such a scenario, the first compressed tile read may be tile "1" in the compressed image portion 700. The second tile read may be tile "2" and next tile "3". The read pattern may continue in this manner, reading the compressed tiles sequentially in a column until tile "K" is read, after which the pattern may dictate that the next tile to be read is tile "K+1." The pattern may continue from tile "K+1", reading sequential tiles in the columns of the first patch until tile "WK" is read. Then the pattern may continue from tile "WK" to read tile "WK+1", reading sequential tiles in the columns of the second patch until tile "2WK" is read. At this point, the TMP module 101 may recognize the vertical patch read pattern and begin prefetching as described in more detail below.

As previously described, the TMP module 101 may be monitoring the read pattern just described and recognize that two adjacent patches of tiles (as boldly outlined in the illustration), each of a height equal to "K" tiles and a width equal to "W" columns, have been read in response to the data request from processor 201. Recognizing that the read request pattern is generating a "vertical patch" of "K×W" down and across the image frame, the TMP module 101 may trigger execution of an intelligent prefetching algorithm that prefetches tiles according to the anticipated pattern. The prefetch pattern may continue until a subsequent read request from processor 201 indicates that the prefetch algorithm is no longer optimal, at which point the TMP module 101 may discontinue prefetching subject to the prefetch pattern just described and continue monitoring in an effort to recognize a new request pattern associated with a predefined prefetch algorithm.

Notably, it is envisioned that embodiments of the solution may not abandon an actively employed prefetching algorithm upon recognition of the first access request that isn't consistent with the anticipated read pattern. That is, depending on embodiment, a seemingly spurious access request may not trigger discontinuation of one prefetching algorithm in favor of another algorithm or no algorithm. As a non-limiting example, certain embodiments of the solution may leverage a shift register of length "n" and with a reset value of 0. For each access to the buffer that abides by the actively employed prefetching algorithm, a '0' may be shifted in, as would be understood by one of ordinary skill in the art of shift registers, while a '1' may be shifted in for each access to the buffer that does not abide by the actively employed prefetching algorithm. In this way, or in a comparable way, certain embodiments of the solution may only trigger discontinuation of an active prefetching algorithm in the event that the number of '1s' in the shift register exceeds a programmable threshold.

Described differently, the TMP module 101 may monitor the fetch of tiles in response to a read request pattern from processor 201 and, if any portion of a vertically-sequential tile is read, continue its effort to match the read request pattern to a predefined vertical patch read pattern by incrementing an estimation of "K" to value "K_1". If/when any portion of a non-vertically sequential tile is read, and the non-vertically sequential tile is in a second column adjacent to the first column that contained the previously read tile, set "K" estimation to "K_1" and begin to increment value "K_2" in association with tile reads from the second column. Also, increment an estimation of "W" to value "W_1". So long as any portion of a vertically-sequential tile is read from the second column, the TMP module 101 may continue matching the read request pattern to a predefined vertical patch read pattern by incrementing "K_2". The matching algorithm continues in this manner, incrementing "W_1" with each new column of tiles read, so long as "K" for a given column equals "K" for the previous column.

If/when any portion of a non-vertically sequential tile is read, and the non-vertical sequential tile is adjacent to previously read tile "K" (i.e, tile "WK+1"), the TMP module 101 may increment W_2 and continue its effort to match the read request pattern to a predefined vertical patch read pattern by incrementing an estimation of "K'" to value "K'_1". If/when any portion of a non-vertical sequential tile is read, and the non-vertically sequential tile is in a second column adjacent to the first column that contained the previously read tile, and "K'" equals "K", set "K'" estimation to "K'_1" and begin to increment value "K'_2" in association with tile reads from the second column. Also, increment an estimation of "W" to value "W_2". So long as any portion of a vertically-sequential tile is read from the second column, the TMP module 101 may continue matching the read request pattern to a predefined vertical patch read pattern by incrementing "K'_2". The matching algorithm continues in this manner, incrementing "W_2" with each new column of tiles read, so long as "K" for a given column equals "K" for the previous column.

If/when any portion of a non-vertically sequential tile is read, and the non-vertical sequential tile is adjacent to previously read tile "2WK−K+1" (i.e, tile "2WK+1"), and "W_1" is determined to equal "W_2", the TMP module 101 may anticipate the continuance of a vertical patch read pattern down and across the image and, in response, trigger execution of an intelligent prefetching pattern that reads tiles in sequential patches of size "K×W" down and across the image, as suggested in the FIG. 7 illustration.

Although prefetching according to an algorithm associated with a vertical patch read pattern, the TMP module 101 may continue to monitor the actual tiles needed to service the ongoing read requests from processor 201 and if, at any point, any portion of an unexpected tile is accessed the TMP module 101 may cause the prefetching algorithm to be discontinued.

Once the TMP module 101 triggers execution of a prefetching algorithm associated with a vertical patch read pattern, tiles may be prefetched according to the pattern in a group of "T" tiles as set by a programmable tuning parameter "T". When prefetching of a group of "T" tiles is complete, and whenever a new read request is received, the tile that is "T" tiles ahead in the pattern of the last-requested tile may be prefetched. In this way, the compression address aperture 113 executing an intelligent tile-based prefetching algorithm in response to recognition of a vertical patch read pattern, may ensure that the next "T" tiles anticipated to be needed to service read requests from processor 201 are in the tile-aware cache and available for low-latency response to the read requests.

Notably, although this exemplary embodiment of the solution illustrated by FIG. 7 has been described within the context of a read request pattern emanating from the processor, it is envisioned that a similar embodiment may employ a vertical patch prefetching in response to recognition that the processor has generated partial tile writes to tiles associated with a vertical patch pattern. In such a scenario, the TMP module 101 may prefetch the full tiles from the memory so that the necessary remainder data is available in cache to complete a full tile write when the processor generates additional partial-tile writes according to the predicted pattern. In this way, embodiments of the solution may avoid the high latency penalty of waiting to confirm that only a partial tile will be written—rather, as soon as a partial-tile write is stored in cache, the remainder data in the tile may be already available in the cache and aggregated with the partial tile to generate a full tile write.

As another example, embodiments of the solution configured to prefetch tiles from memory in response to recognizing a partial-tile write pattern may use a shift register to determine when to discontinue prefetching full tiles in anticipation of accommodating partial-tile write transactions. In such an embodiment, a shift register of length "n" and with a reset value of 0 may be employed. For each partial-tile write that abides by the actively employed prefetching algorithm, a '0' may be shifted in, as would be understood by one of ordinary skill in the art of shift registers, while a '1' may be shifted in for each partial-tile write that does not abide by the actively employed prefetching algorithm. In this way, or in a comparable way, certain embodiments of the solution may only trigger discontinuation of an active prefetching algorithm for accommodation of partial-tile writes in the event that the number of '1s' in the shift register exceeds a programmable threshold.

Figure 8:
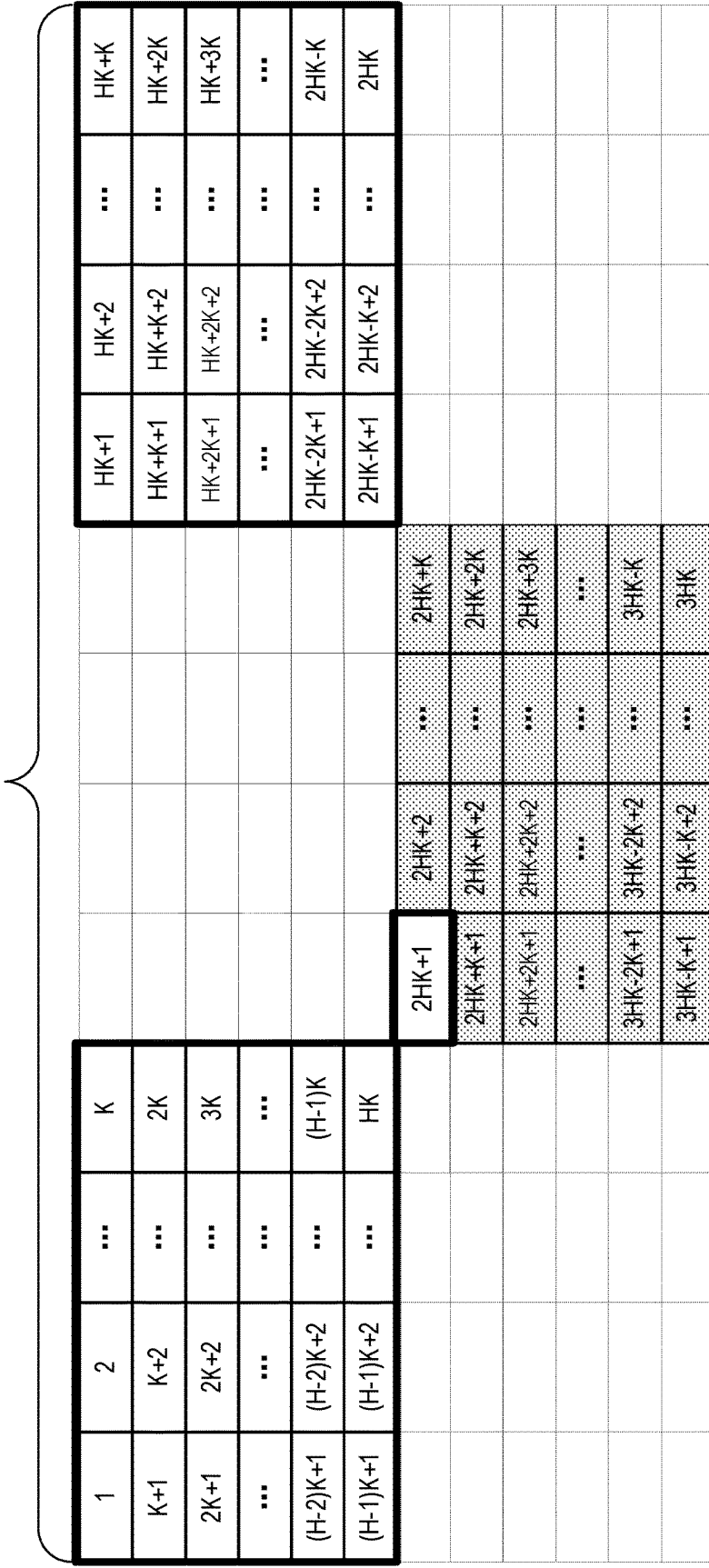
FIG. 8 illustrates an exemplary intelligent tile-based prefetching methodology according to the solution in response to recognition of a randomly-located horizontal patch read pattern.

FIG. 8 illustrates an exemplary intelligent tile-based prefetching methodology according to the solution in response to recognition of a randomly-located horizontal patch read pattern. Illustrated is a portion 800 of a compressed image, divided into tiles, such as may be stored in memory 112. The compressed image portion 800 is of a total size of 6HK tiles, where each tile is of a certain amount of pixels in width and a certain amount of pixels in height. As can be understood from the illustration, the image portion 800 has three blocks or patches of tiles each containing "H" rows of tiles which are either fetched or prefetched according to the algorithm explained below and three blocks not fetched or prefetched (depicted in shadow lines), hence a total depiction of 6HK tiles where the "K" variable represents a certain quantity.

Briefly referring back to the FIG. 3 description, in response to a read request from the processor 201, the compression address aperture 113 may query a lookup table for the appropriate aperture address and begin reading compressed tiles from the memory 112 accordingly. In such a scenario, the first compressed tile read may be tile "1" in the compressed image portion 800. The second tile read may be tile "2" and next tile "3". The read pattern may continue in this manner, reading the compressed tiles sequentially in a row until tile "K" is read, after which the pattern may dictate that the next tile to be read is tile "K+1." The pattern may continue from tile "K+1", reading sequential tiles in the rows of the first patch until tile "HK" is read. Then the pattern may continue from tile "HK" to read tile "HK+1", reading sequential tiles in the rows of the second patch until tile "2HK" is read. At this point, the TMP module 101 may recognize the randomly-located horizontal patch read pattern and begin prefetching as described in more detail below.

As previously described, the TMP module 101 may be monitoring the read pattern just described and recognize that two equally sized patches of tiles (as boldly outlined in the illustration), each of a length equal to "K" tiles and a height equal to "H" rows, have been read in response to the data request from processor 201. Recognizing that the read request pattern is generating "randomly-located horizontal patches" of size "K×H" across the image frame, the TMP module 101 may trigger execution of an intelligent prefetching algorithm that prefetches tiles according to the anticipated pattern. The prefetch pattern may continue until a subsequent read request from processor 201 indicates that the prefetch algorithm is no longer optimal, at which point the TMP module 101 may discontinue prefetching subject to the prefetch pattern just described and continue monitoring in an effort to recognize a new request pattern associated with a predefined prefetch algorithm.

Notably, it is envisioned that embodiments of the solution may not abandon an actively employed prefetching algorithm upon recognition of the first access request that isn't consistent with the anticipated read pattern. That is, depending on embodiment, a seemingly spurious access request may not trigger discontinuation of one prefetching algorithm in favor of another algorithm or no algorithm. As a non-limiting example, certain embodiments of the solution may leverage a shift register of length "n" and with a reset value of 0. For each access to the buffer that abides by the actively employed prefetching algorithm, a '0' may be shifted in, as would be understood by one of ordinary skill in the art of shift registers, while a '1' may be shifted in for each access to the buffer that does not abide by the actively employed prefetching algorithm. In this way, or in a comparable way, certain embodiments of the solution may only trigger discontinuation of an active prefetching algorithm in the event that the number of '1s' in the shift register exceeds a programmable threshold.

Described differently, the TMP module 101 may monitor the fetch of tiles in response to a read request pattern from processor 201 and, if any portion of a horizontally-sequential tile is read, continue its effort to match the read request pattern to a predefined horizontal patch read pattern by incrementing an estimation of "K" to value "K_1". If/when any portion of a non-horizontally sequential tile is read, and the non-horizontally sequential tile is in a second row adjacent to the first row that contained the previously read tile, set "K" estimation to "K_1" and begin to increment value "K_2" in association with tile reads from the second row. Also, increment an estimation of "H" to value "H 1". So long as any portion of a horizontally-sequential tile is read from the second row, the TMP module 101 may continue matching the read request pattern to a predefined horizontal patch read pattern by incrementing "K_2". The matching algorithm continues in this manner, incrementing "H_1" with each new row of tiles read, so long as "K" for a given row equals "K" for the previous row.

If/when any portion of a non-horizontally sequential tile is read, and the non-horizontal sequential tile is not adjacent to previously read tile "K" (such as tile "HK+1"), the TMP module 101 may increment H_2 and continue its effort to match the read request pattern to a randomly-located predefined horizontal patch read pattern by incrementing an estimation of "K" to value "K'_1". If/when any portion of a non-horizontally sequential tile is read, and the non-horizontally sequential tile is in a second row adjacent to the first row that contained the previously read tile, and "K'" equals "K", set "K'" estimation to "K'_1" and begin to increment value "K'_2" in association with tile reads from the second row. Also, increment an estimation of "H" to value "H_2". So long as any portion of a horizontally-sequential tile is read from the second row, the TMP module 101 may continue matching the read request pattern to a predefined randomly-located horizontal patch read pattern by incrementing "K'_2". The matching algorithm continues in this manner, incrementing "H_2" with each new row of tiles read, so long as "K" for a given row equals "K" for the previous row.

If/when any portion of a non-horizontally sequential tile is read, and the non-horizontal sequential tile is not logically a part of the second patch, and "H_1" is determined to equal "H_2", the TMP module 101 may anticipate the continuance of a randomly-located horizontal patch read pattern across the image with the next patch beginning with the non-horizontal sequential tile is not logically a part of the second patch and, in response, trigger execution of an intelligent prefetching pattern that reads tiles in sequential patches of size "K×H" across the image with each sequential patch beginning with the first tile read that is not logically a part of the previously read or fetched patch, as suggested in the FIG. 8 illustration.

Although prefetching according to an algorithm associated with a randomly-located horizontal patch read pattern, the TMP module 101 may continue to monitor the actual tiles needed to service the ongoing read requests from processor 201 and if, at any point, any portion of an unexpected tile is accessed the TMP module 101 may cause the prefetching algorithm to be discontinued.

Once the TMP module 101 triggers execution of a prefetching algorithm associated with a randomly-located horizontal patch read pattern, tiles may be prefetched according to the pattern in a group of "T" tiles as set by a programmable tuning parameter "T". When prefetching of a group of "T" tiles is complete, and whenever a new read request is received, the tile that is "T" tiles ahead in the pattern of the last-requested tile may be prefetched. In this way, the compression address aperture 113 executing an intelligent tile-based prefetching algorithm in response to recognition of a randomly-located horizontal patch read pattern, may ensure that the next "T" tiles anticipated to be needed to service read requests from processor 201 are in the tile-aware cache and available for low-latency response to the read requests.

Notably, although this exemplary embodiment of the solution illustrated by FIG. 8 has been described within the context of a read request pattern emanating from the processor, it is envisioned that a similar embodiment may employ a randomly-located horizontal patch prefetching in response to recognition that the processor has generated partial tile writes to tiles associated with a randomly-located horizontal patch pattern. In such a scenario, the TMP module 101 may prefetch the full tiles from the memory so that the necessary remainder data is available in cache to complete a full tile write when the processor generates additional partial-tile writes according to the predicted pattern. In this way, embodiments of the solution may avoid the high latency penalty of waiting to confirm that only a partial tile will be written—rather, as soon as a partial-tile write is stored in cache, the remainder data in the tile may be already available in the cache and aggregated with the partial tile to generate a full tile write.

As another example, embodiments of the solution configured to prefetch tiles from memory in response to recognizing a partial-tile write pattern may use a shift register to determine when to discontinue prefetching full tiles in anticipation of accommodating partial-tile write transactions. In such an embodiment, a shift register of length "n" and with a reset value of 0 may be employed. For each partial-tile write that abides by the actively employed prefetching algorithm, a '0' may be shifted in, as would be understood by one of ordinary skill in the art of shift registers, while a '1' may be shifted in for each partial-tile write that does not abide by the actively employed prefetching algorithm. In this way, or in a comparable way, certain embodiments of the solution may only trigger discontinuation of an active prefetching algorithm for accommodation of partial-tile writes in the event that the number of '1s' in the shift register exceeds a programmable threshold.

Figure 9:
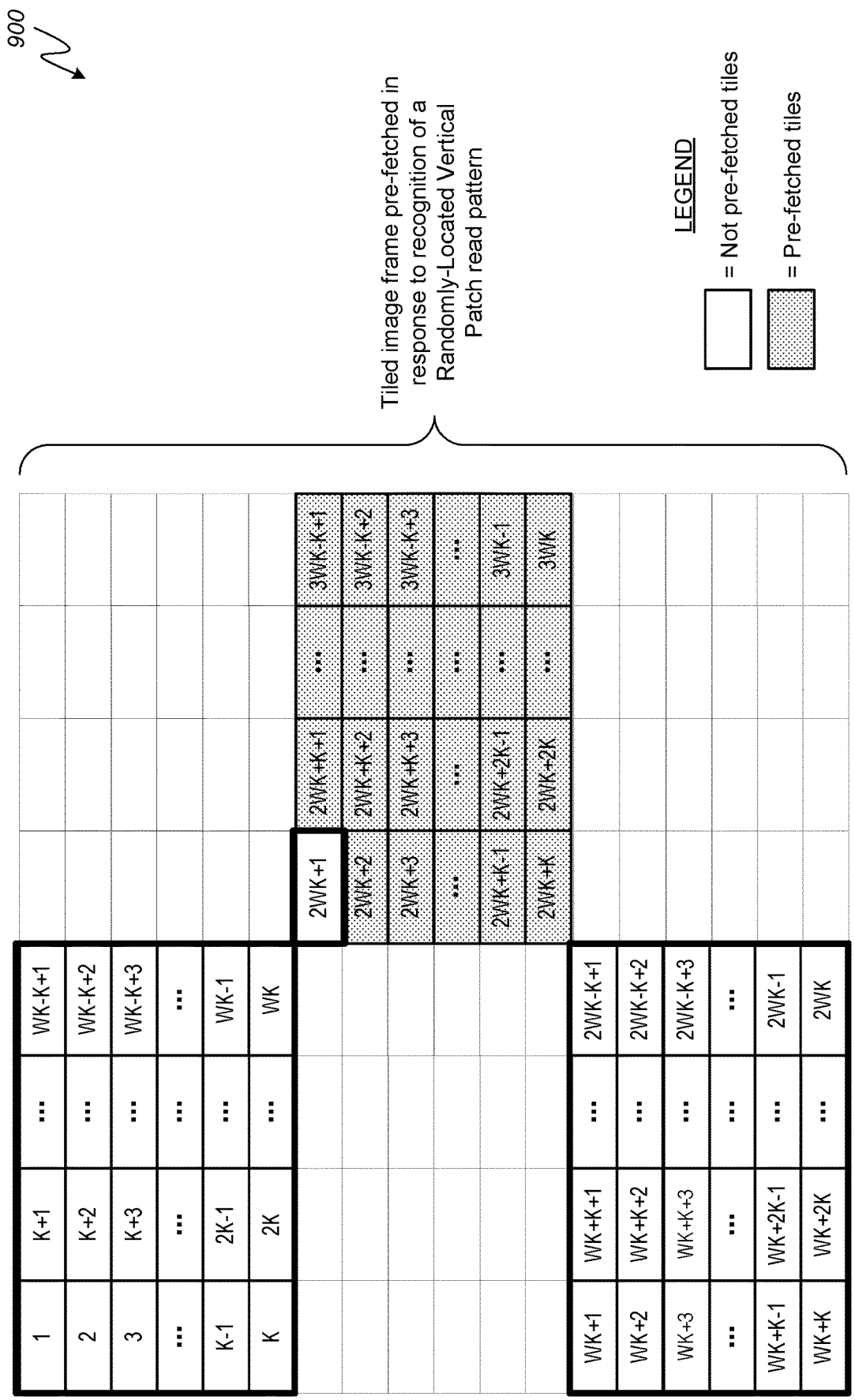
FIG. 9 illustrates an exemplary intelligent tile-based prefetching methodology according to the solution in response to recognition of a randomly-located vertical patch read pattern.

FIG. 9 illustrates an exemplary intelligent tile-based prefetching methodology according to the solution in response to recognition of a randomly-located vertical patch read pattern. Illustrated is a portion 900 of a compressed image, divided into tiles, such as may be stored in memory 112. The compressed image portion 900 is of a total size of 6HK tiles, where each tile is of a certain amount of pixels in width and a certain amount of pixels in height. As can be understood from the illustration, the image portion 900 has three blocks or patches of tiles each containing "W" columns of tiles which are either fetched or prefetched according to the algorithm explained below and three blocks not fetched or prefetched (depicted in shadow lines), hence a total depiction of 6HK tiles where the "K" variable represents a certain quantity.

Briefly referring back to the FIG. 3 description, in response to a read request from the processor 201, the compression address aperture 113 may query a lookup table for the appropriate aperture address and begin reading compressed tiles from the memory 112 accordingly. In such a scenario, the first compressed tile read may be tile "1" in the compressed image portion 900. The second tile read may be tile "2" and next tile "3". The read pattern may continue in this manner, reading the compressed tiles sequentially in a column until tile "K" is read, after which the pattern may dictate that the next tile to be read is tile "K+1." The pattern may continue from tile "K+1", reading sequential tiles in the columns of the first patch until tile "WK" is read. Then the pattern may continue from tile "WK" to read tile "WK+1" in the second patch, reading sequential tiles in the columns of the second patch until tile "2WK" is read. At this point, the TMP module 101 may recognize the randomly-located vertical patch read pattern and begin prefetching as described in more detail below.

As previously described, the TMP module 101 may be monitoring the read pattern just described and recognize that two equally sized patches of tiles (as boldly outlined in the illustration), each of a height equal to "K" tiles and a length equal to "W" columns, have been read in response to the data request from processor 201. Recognizing that the read request pattern is generating "randomly-located vertical patches" of size "K×W" down and across the image frame, the TMP module 101 may trigger execution of an intelligent prefetching algorithm that prefetches tiles according to the anticipated pattern. The prefetch pattern may continue until a subsequent read request from processor 201 indicates that the prefetch algorithm is no longer optimal, at which point the TMP module 101 may discontinue prefetching subject to the prefetch pattern just described and continue monitoring in an effort to recognize a new request pattern associated with a predefined prefetch algorithm.

Notably, it is envisioned that embodiments of the solution may not abandon an actively employed prefetching algorithm upon recognition of the first access request that isn't consistent with the anticipated read pattern. That is, depending on embodiment, a seemingly spurious access request may not trigger discontinuation of one prefetching algorithm in favor of another algorithm or no algorithm. As a non-limiting example, certain embodiments of the solution may leverage a shift register of length "n" and with a reset value of 0. For each access to the buffer that abides by the actively employed prefetching algorithm, a '0' may be shifted in, as would be understood by one of ordinary skill in the art of shift registers, while a '1' may be shifted in for each access to the buffer that does not abide by the actively employed prefetching algorithm. In this way, or in a comparable way, certain embodiments of the solution may only trigger discontinuation of an active prefetching algorithm in the event that the number of '1s' in the shift register exceeds a programmable threshold.

Described differently, the TMP module 101 may monitor the fetch of tiles in response to a read request pattern from processor 201 and, if any portion of a vertically-sequential tile is read, continue its effort to match the read request pattern to a predefined vertical patch read pattern by incrementing an estimation of "K" to value "K_1". If/when any portion of a non-vertical sequential tile is read, and the non-vertical sequential tile is in a second column adjacent to the first column that contained the previously read tile, set "K" estimation to "K_1" and begin to increment value "K_2" in association with tile reads from the second column. Also, increment an estimation of "W" to value "W_1". So long as any portion of a vertically-sequential tile is read from the second column, the TMP module 101 may continue matching the read request pattern to a predefined vertical patch read pattern by incrementing "K_2". The matching algorithm continues in this manner, incrementing "W_1" with each new column of tiles read, so long as "K" for a given column equals "K" for the previous column.

If/when any portion of a non-vertically sequential tile is read, and the non-vertical sequential tile is not adjacent to previously read tile "K" (such as tile "WK+1"), the TMP module 101 may increment W_2 and continue its effort to match the read request pattern to a randomly-located predefined vertical patch read pattern by incrementing an estimation of "K'" to value "K'_1". If/when any portion of a non-vertical sequential tile is read, and the non-vertical sequential tile is in a second column adjacent to the first column that contained the previously read tile, and "K'" equals "K", set "K'" estimation to "K'_1" and begin to increment value "K'_2" in association with tile reads from the second column. Also, increment an estimation of "W" to value "W_2". So long as any portion of a vertically-sequential tile is read from the second column, the TMP module 101 may continue matching the read request pattern to a predefined randomly-located vertical patch read pattern by incrementing "K'_2". The matching algorithm continues in this manner, incrementing "W_2" with each new column of tiles read, so long as "K" for a given column equals "K" for the previous column.

If/when any portion of a non-vertical sequential tile is read, and the non-vertical sequential tile is not logically a part of the second patch, and "W_1" is determined to equal "W_2", the TMP module 101 may anticipate the continuance of a randomly-located vertical patch read pattern across the image with the next patch beginning with the non-vertical sequential tile that is not logically a part of the second patch and, in response, trigger execution of an intelligent prefetching pattern that reads tiles in sequential patches of size "K×W" across the image with each sequential patch beginning with the first tile read that is not logically a part of the previously read or fetched patch, as suggested in the FIG. 9 illustration (e.g., tile 2WK+1).

Although prefetching according to an algorithm associated with a randomly-located vertical patch read pattern, the TMP module 101 may continue to monitor the actual tiles needed to service the ongoing read requests from processor 201 and if, at any point, any portion of an unexpected tile is accessed the TMP module 101 may cause the prefetching algorithm to be discontinued.

Once the TMP module 101 triggers execution of a prefetching algorithm associated with a randomly-located vertical patch read pattern, tiles may be prefetched according to the pattern in a group of "T" tiles as set by a programmable tuning parameter "T". When prefetching of a group of "T" tiles is complete, and whenever a new read request is received, the tile that is "T" tiles ahead in the pattern of the last-requested tile may be prefetched. In this way, the compression address aperture 113 executing an intelligent tile-based prefetching algorithm in response to recognition of a randomly-located vertical patch read pattern, may ensure that the next "T" tiles anticipated to be needed to service read requests from processor 201 are in the tile-aware cache and available for low-latency response to the read requests.

Notably, although this exemplary embodiment of the solution illustrated by FIG. 9 has been described within the context of a read request pattern emanating from the processor, it is envisioned that a similar embodiment may employ a randomly-located vertical patch prefetching in response to recognition that the processor has generated partial tile writes to tiles associated with a randomly-located vertical patch pattern. In such a scenario, the TMP module 101 may prefetch the full tiles from the memory so that the necessary remainder data is available in cache to complete a full tile write when the processor generates additional partial-tile writes according to the predicted pattern. In this way, embodiments of the solution may avoid the high latency penalty of waiting to confirm that only a partial tile will be written—rather, as soon as a partial-tile write is stored in cache, the remainder data in the tile may be already available in the cache and aggregated with the partial tile to generate a full tile write.

As another example, embodiments of the solution configured to prefetch tiles from memory in response to recognizing a partial-tile write pattern may use a shift register to determine when to discontinue prefetching full tiles in anticipation of accommodating partial-tile write transactions. In such an embodiment, a shift register of length "n" and with a reset value of 0 may be employed. For each partial-tile write that abides by the actively employed prefetching algorithm, a '0' may be shifted in, as would be understood by one of ordinary skill in the art of shift registers, while a '1' may be shifted in for each partial-tile write that does not abide by the actively employed prefetching algorithm. In this way, or in a comparable way, certain embodiments of the solution may only trigger discontinuation of an active prefetching algorithm for accommodation of partial-tile writes in the event that the number of '1s' in the shift register exceeds a programmable threshold.

Figure 10:
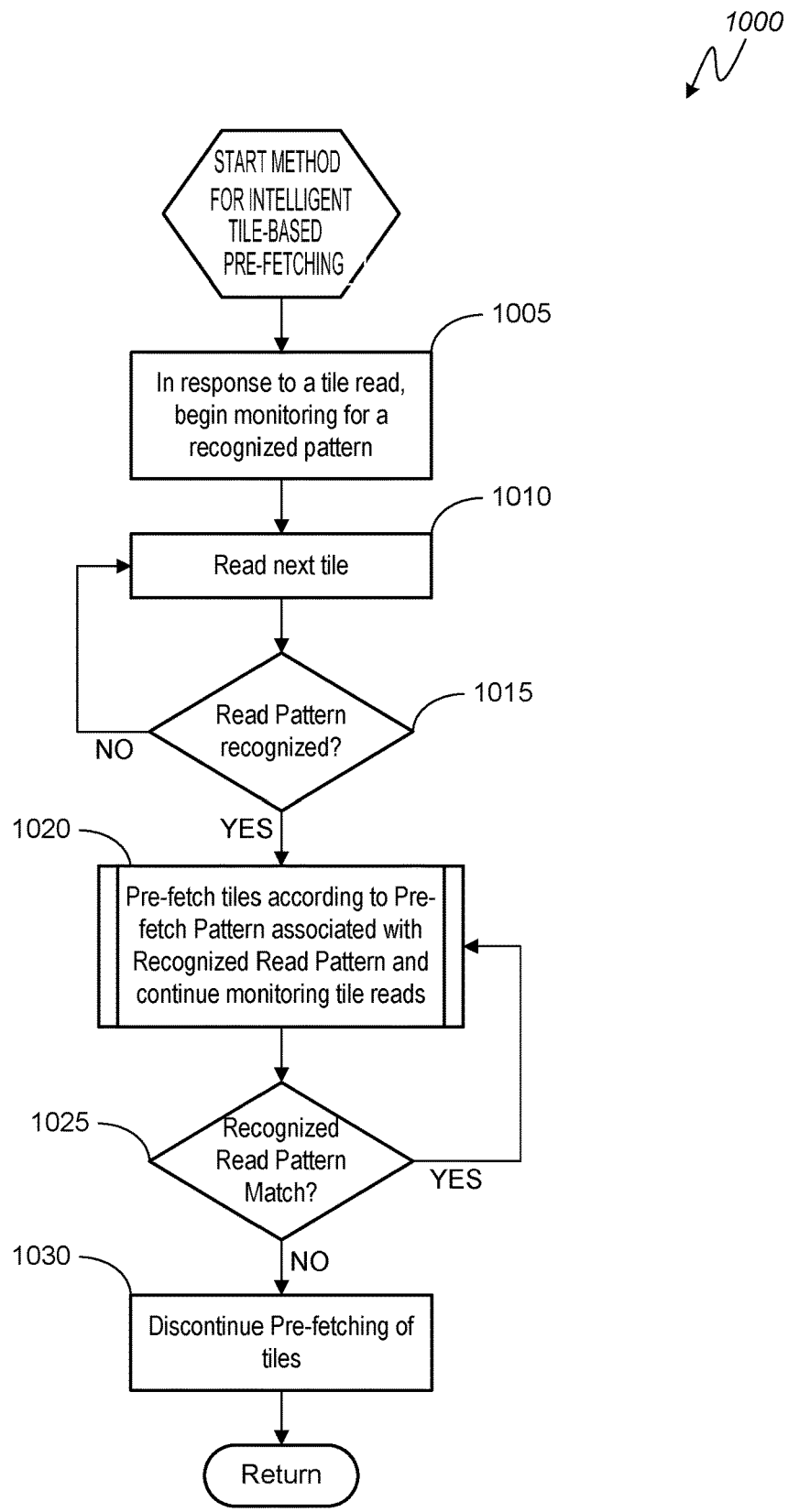
FIG. 10 is a logical flowchart illustrating an intelligent tile-based prefetching method according to the solution.

FIG. 10 is a logical flowchart illustrating an intelligent tile-based prefetching method 1000 according to the solution. Beginning at block 1005, when a tile is read in response to a data request from a processing component, such as processor 201 in FIG. 3, the method 1000 initiates monitoring of tile reads for the purpose of matching a tile read pattern to a predefined pattern. Next, at block 1010, a next tile is read and, at decision block 1015, the method 1000 determines if, based on the tiles that have been read (whether fully read or partially read), the tile read pattern matches a predefined pattern. If the tile read pattern does not match a predefined pattern (such as, but not limited to, a horizontal stripe pattern, a vertical stripe pattern, a horizontal patch pattern, a vertical patch pattern, a randomly-located horizontal patch pattern, or a randomly-located vertical patch pattern), the "NO" branch is followed back to block 1010 and a next tile is read. If, however, the read pattern matches a predefined pattern, the method 1000 follows the "YES" branch to process block 1020.

At process block 1020, the method 1000 may execute a prefetching algorithm that is associated with the matched predefined pattern. Notably the process for matching the read pattern to a predefined pattern, and the process for prefetching tiles in response to recognizing that the read pattern matches a predefined pattern, may be, but is not limited to being, consistent with that which has been shown and described herein relative to, inter alia, FIGS. 4-9.

Returning to the method 1000, while prefetching tiles according to process block 1020, the method 1000 continues to monitor the read tiles in order to determine whether the ongoing read pattern continues to match the recognized read pattern that triggered the prefetching at process 1020. At decision block 1025, so long as the ongoing read pattern continues to match the read pattern previously recognized and matched to a predefined pattern, then the "YES" branch is followed back to process block 1020 and the previously executed prefetching algorithm continues. If, however, a tile read indicates that the ongoing read pattern has changed, i.e. that a tile, or tiles, inconsistent or unexpected in view of the predefined pattern that triggered the prefetching pattern has/have been read, then the "NO" branch is followed to block 1030 and the prefetching algorithm is discontinued. The method 1000 returns.

Figure 11:
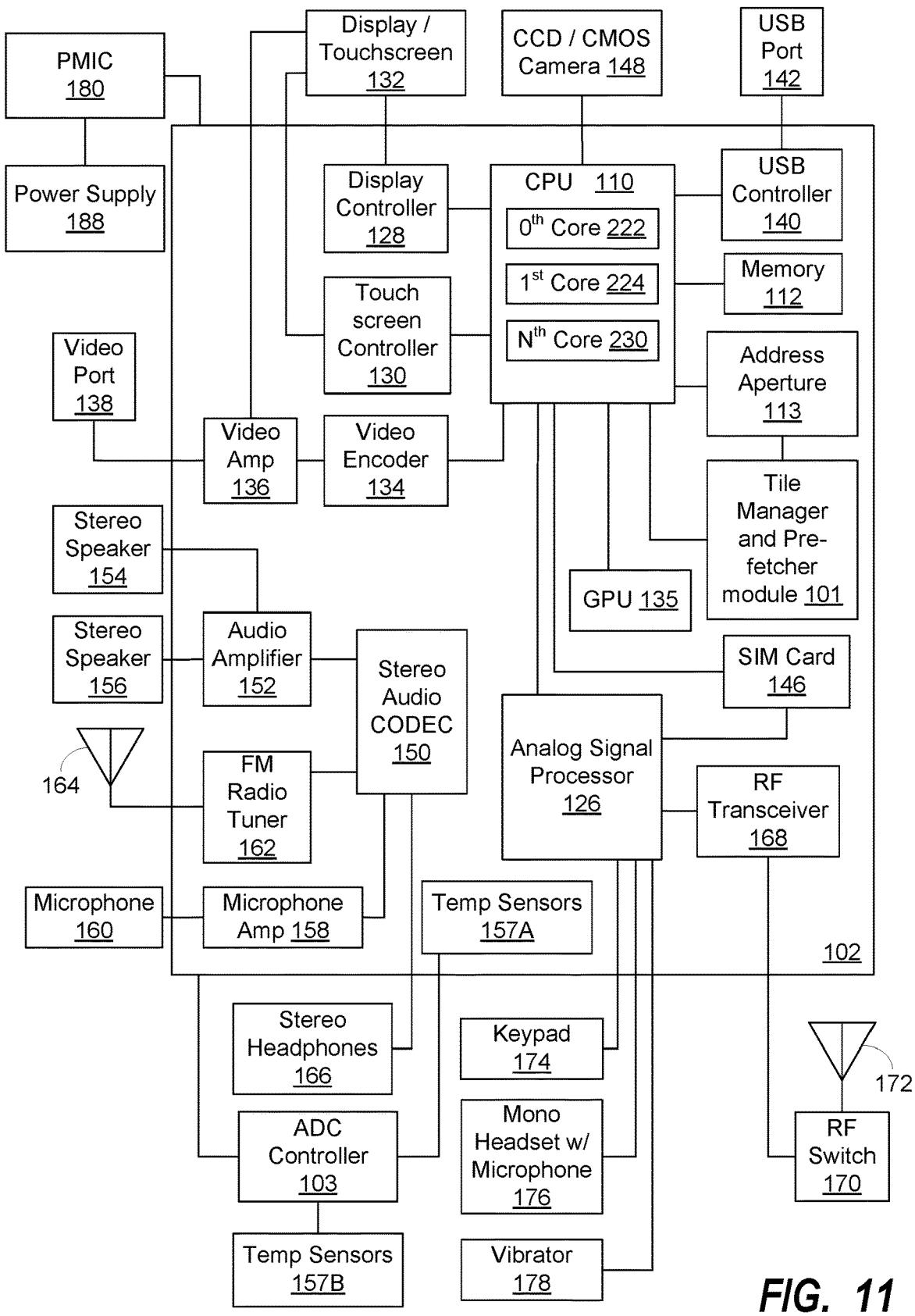
FIG. 11 is a functional block diagram illustrating an exemplary, non-limiting aspect of a portable computing device ("PCD") in the form of a wireless telephone for implementing intelligent tile-based prefetching methods and systems according to the solution.

FIG. 11 is a functional block diagram illustrating an exemplary, non-limiting aspect of a portable computing device ("PCD") 100 in the form of a wireless telephone for implementing intelligent tile-based prefetching methods and systems according to the solution. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill.

In general, tile manager and prefetchter ("TMP") module 101 may be formed from hardware and/or firmware and may be responsible for intelligent tile-based prefetching. The TPM module 101 may be coupled to, or a part of, compression address aperture 113. As illustrated in FIG. 11, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136. As depicted in FIG. 11, a universal serial bus ("USB") controller 140 is coupled to the CPU 110. Also, a USB port 142 is coupled to the USB controller 140.

A memory 112, which may include a PoP memory, a cache, a mask ROM/Boot ROM, a boot OTP memory, a type DDR of DRAM memory, etc. may also be coupled to the CPU 110. A subscriber identity module ("SIM") card 146 may also be coupled to the CPU 110. Further, as shown in FIG. 11, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 11, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 11 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 11 further indicates that a radio frequency ("RF") transceiver 168 may be coupled to the analog signal processor 126. An RF switch 170 may be coupled to the RF transceiver 168 and an RF antenna 172. As shown in FIG. 11, a keypad 174 may be coupled to the analog signal processor 126. Also, a mono headset with a microphone 176 may be coupled to the analog signal processor 126. Further, a vibrator device 178 may be coupled to the analog signal processor 126. FIG. 11 also shows that a power supply 188, for example a battery, is coupled to the on-chip system 102 through a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller (not shown). However, other types of thermal sensors 157 may be employed.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the PMIC 180 and the power supply 188 are external to the on-chip system 102. It will be understood, however, that one or more of these devices depicted as external to the on-chip system 102 in the exemplary embodiment of a PCD 100 in FIG. 11 may reside on chip 102 in other exemplary embodiments.

In a particular aspect, one or more of the method steps described herein may be implemented by executable instructions and parameters stored in the memory 112 or as form the TPM module 101 and/or the compression address aperture 113 in general (see FIG. 3). Further, the TPM module 101, the aperture 113 in general (which includes CODEC module 114, tile-aware cache 159 and buffer/tile mapping module 132), the memory 112, the instructions stored therein, or a combination thereof may serve as a means for performing one or more of the method steps described herein.

Figure 12:
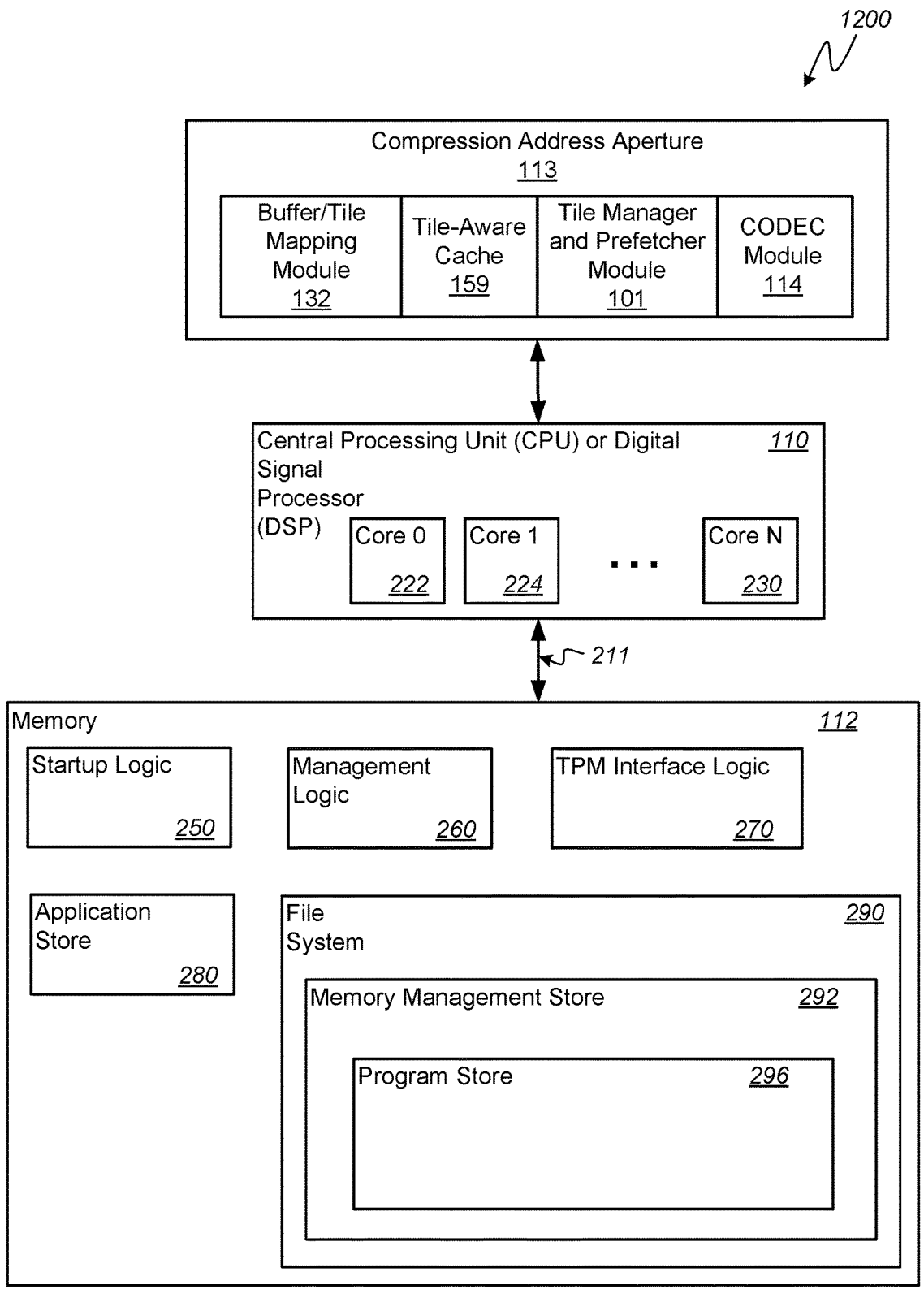
FIG. 12 is a schematic diagram illustrating an exemplary software architecture of the PCD of FIG. 11 for executing intelligent tile-based prefetching methodologies.

FIG. 12 is a schematic diagram illustrating an exemplary software architecture 1200 of the PCD of FIG. 11 for executing intelligent tile-based prefetching methodologies. As illustrated in FIG. 12, the CPU or digital signal processor 110 is coupled to the memory 112 via main bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores.

The CPU 110 may receive commands from one or more of the modules of compression address aperture 113 that may comprise software and/or hardware. If embodied as software, the module(s) comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the Nm core 230 via one or more shared caches and they may implement message or instruction passing via network topologies such as bus, ring, mesh and crossbar topologies.

Bus 211 may include multiple communication paths via one or more wired or wireless connections, as is known in the art and described above in the definitions. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 12, it should be noted that one or more of startup logic 250, management logic 260, TPM interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the TPM interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for intelligent tile-based prefetching. The startup logic 250 may identify, load and execute a select intelligent tile-based prefetching program. An exemplary select program may be found in the program store 296 of the embedded file system 290. The exemplary select program, when executed by one or more of the core processors in the CPU 110 may operate in accordance with one or more signals provided by the compression address aperture 113 to implement intelligent tile-based prefetching methodologies.

The management logic 260 includes one or more executable instructions for terminating an intelligent tile-based prefetching program on one or more of the respective processor cores, as well as selectively identifying, loading, and executing a more suitable replacement program. The management logic 260 is arranged to perform these functions at run time or while the PCD 100 is powered and in use by an operator of the device. A replacement program may be found in the program store 296 of the embedded file system 290.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the programmable tuning parameter "T" associated with a particular intelligent tile-based prefetching algorithm.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged memory management store 292. In this regard, the file system 290 may include a reserved section of its total file system capacity for the storage of information for the configuration and management of the various intelligent tile-based prefetching algorithms used by the PCD 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Therefore, although selected aspects have been illustrated and described in detail, it will be understood that various substitutions and alterations may be made therein without departing from the spirit and scope of the present invention, as defined by the following claims.

What is claimed is:

1. A method for intelligent tile-based prefetching in a portable computing device ("PCD"), the method comprising:
receiving at an address aperture a first data request from a processing component, the first data request comprising a linear memory address;
in response to receiving the first data request, the address aperture converting the linear memory address to an aperture address associated with a tile-based address structure of a memory component;
using the aperture address, the address aperture reading a plurality of data tiles associated with a compressed image stored in the memory component having the tile-based address structure;
the address aperture storing the read data tiles in a tile-aware cache;
the address aperture decompressing the read data tiles from the tile-aware cache into uncompressed data and sending the uncompressed data to the processing component;
the address aperture monitoring the reading of the plurality of data tiles to determine a first data tile read pattern;
in response to determining the first data tile read pattern, the address aperture executing a first data tile prefetching algorithm associated with the first data tile read pattern, wherein the first data tile prefetching algorithm operates to prefetch data tiles from the memory component and store the prefetched data tiles in the tile-aware cache; and
in response to a subsequent data request received from the processing component matching the first data tile read pattern, the address aperture decompresses the prefetched data tiles from the tile-aware cache into uncompressed data and sending the uncompressed data to the processing component, such that the prefetched data tiles stored in the tile-aware cache reduce latency of the subsequent data request.

2. The method of claim 1, further comprising:
the address aperture determining that the first data tile read pattern has discontinued; and
in response to determining that the first data tile read pattern has discontinued, discontinuing execution of the first data tile prefetching algorithm.

3. The method of claim 2, further comprising:
monitoring the reading of the plurality of data tiles to determine a second data tile read pattern; and
in response to determining the second data tile read pattern, the address aperture executing a second data tile prefetching algorithm associated with the second data tile read pattern, wherein the second data tile prefetching algorithm operates to prefetch data tiles from the memory component and store the prefetched data tiles in the tile-aware cache.

4. The method of claim 1, wherein the processing component is unaware of the tile-based address structure of the memory component and each data request from the processing component comprises a linear memory address.

5. The method of claim 4, further comprising querying a lookup table to determine a compressed data memory address that is mapped to the linear memory address.

6. The method of claim 1, wherein the first data tile read pattern is one of a horizontal stripe read pattern, a vertical stripe read pattern, a horizontal patch read pattern, a vertical patch read pattern, a randomly-located horizontal patch read pattern, and a randomly-located vertical patch read pattern.

7. A system for intelligent tile-based prefetching in a portable computing device ("PCD"), the system comprising:
a processing component sending a first data request to an address aperture;
the address aperture receiving the first data request, the first data request comprising a linear address;
in response to receiving the first data request, the address aperture converting the linear address to an aperture address associated with a tile-based address structure of a memory component;
using the aperture address, the address aperture reading a plurality of data tiles associated with a compressed image stored in the memory component according to the tile-based address structure;
the address aperture storing the read data tiles in a tile-aware cache;
the address aperture decompressing the read data tiles from the tile-aware cache into uncompressed data and sending the uncompressed data to the processing component;
based on the reading of the plurality of data tiles, the address aperture determining a first data tile read pattern;
in response to the address aperture determining the first data tile read pattern, the address aperture executing a first data tile prefetching algorithm associated with the first data tile read pattern, wherein the first data tile prefetching algorithm operates to prefetch data tiles from the memory component and store the prefetched data tiles in the tile-aware cache; and
in response to a subsequent data request received from the processing component matching the first data tile read pattern, the address aperture decompresses the prefetched data tiles from the tile-aware cache into uncompressed data and sending the uncompressed data to the processing component, such that the prefetched data tiles stored in the tile-aware cache reduce latency of the subsequent data request.

8. The system of claim 7, further configured to:
determine that the first data tile read pattern has discontinued; and
in response to determining that the first data tile read pattern has discontinued, discontinue execution of the first data tile prefetching algorithm.

9. The system of claim 8, further configured to:
monitor the reading of the plurality of data tiles to determine a second data tile read pattern; and
in response to determining the second data tile read pattern, execute a second data tile prefetching algorithm associated with the second data tile read pattern, wherein the second data tile prefetching algorithm operates to prefetch data tiles from the memory component and store the prefetched data tiles in the tile-aware cache.

10. The system of claim 7, wherein the processing component is unaware of the tile-based address structure of the memory component and each data request comprises a linear memory address.

11. The system of claim 10, wherein the address aperture queries a lookup table to determine a compressed data memory address that is mapped to the linear memory address.

12. The system of claim 7, wherein the first data tile read pattern is one of a horizontal stripe read pattern, a vertical stripe read pattern, a horizontal patch read pattern, a vertical patch read pattern, a randomly-located horizontal patch read pattern, and a randomly-located vertical patch read pattern.

13. The system of claim 7, wherein the PCD is in the form of a wireless telephone.

14. A system for intelligent tile-based prefetching in a portable computing device ("PCD"), the method comprising:
means for receiving a first data request from a processing component, the first data request comprising a linear address;
means for, in response to receiving the first data request, converting the linear address to an aperture address associated with a tile-based address structure of a memory component;
means for reading a plurality of data tiles by using the aperture address associated with a compressed image stored in the memory component having the tile-based address structure;
means for storing the read data tiles in a tile-aware cache;
means for decompressing the read data tiles from the tile-aware cache into uncompressed data and sending the uncompressed data to the processing component;
means for monitoring the reading of the plurality of data tiles to determine a first data tile read pattern;
means for, in response to determining the first data tile read pattern, executing a first data tile prefetching algorithm associated with the first data tile read pattern, wherein the first data tile prefetching algorithm operates to prefetch data tiles from the memory component and store the prefetched data tiles in the tile-aware cache; and
means for decompressing the prefetched data tiles from the tile-aware cache into uncompressed data in response to a subsequent data request received from the processing component matching the first data tile read pattern and sending the uncompressed data to the processing component, such that the prefetched data tiles stored in the tile-aware cache reduce latency of the subsequent data request.

15. The system of claim 14, further comprising:
means for determining that the first data tile read pattern has discontinued; and
means for, in response to determining that the first data tile read pattern has discontinued, discontinuing execution of the first data tile prefetching algorithm.

16. The system of claim 15, further comprising:
means for monitoring the reading of the plurality of data tiles to determine a second data tile read pattern; and
means for, in response to determining the second data tile read pattern, executing a second data tile prefetching algorithm associated with the second data tile read pattern, wherein the second data tile prefetching algorithm operates to prefetch data tiles from the memory component and store the prefetched data tiles in the tile-aware cache.

17. The system of claim 14, wherein each data request comprises a linear memory address.

18. The system of claim 17, further comprising means for querying a lookup table to determine a compressed data memory address that is mapped to the linear memory address.

19. The system of claim 14, wherein the first data tile read pattern is one of a horizontal stripe read pattern, a vertical stripe read pattern, a horizontal patch read pattern, a vertical patch read pattern, a randomly-located horizontal patch read pattern, and a randomly-located vertical patch read pattern.

20. The system of claim 14, wherein the PCD is in the form of a wireless telephone.

21. A computer program product comprising a non-transitory computer usable medium having a computer readable program code embodied therein, said computer readable program code adapted to be executed to implement a method for intelligent tile-based prefetching in a portable computing device ("PCD"), said method comprising:

receiving at an address aperture a first data request from a processing component, the first data request comprising a linear memory address;

in response to receiving the first data request, the address aperture converting the linear memory address to an aperture address associated with a tile-based address structure of a memory component;

using the aperture address, the address aperture reading a plurality of data tiles associated with a compressed image stored in the memory component having the tile-based address structure;

the address aperture storing the read data tiles in a tile-aware cache;

the address aperture decompressing the read data tiles from the tile-aware cache into uncompressed data and sending the uncompressed data to the processing component;

the address aperture monitoring the reading of the plurality of data tiles to determine a first data tile read pattern;

in response to determining the first data tile read pattern, the address aperture executing a first data tile prefetching algorithm associated with the first data tile read pattern, wherein the first data tile prefetching algorithm operates to prefetch data tiles from the memory component and store the prefetched data tiles in the tile-aware cache; and in response to a subsequent data request received from the processing component matching the first data tile read pattern, the address aperture decompresses the prefetched data tiles from the tile-aware cache into uncompressed data and sending the uncompressed data to the processing component, such that the prefetched data tiles stored in the tile-aware cache reduce latency of the subsequent data request.

22. The computer program product of claim 21, further comprising:

the address aperture determining that the first data tile read pattern has discontinued; and in response to determining that the first data tile read pattern has discontinued, discontinuing execution of the first data tile prefetching algorithm.

23. The computer program product of claim 22, further comprising:

monitoring the reading of the plurality of data tiles to determine a second data tile read pattern; and in response to determining the second data tile read pattern, the address aperture executing a second data tile prefetching algorithm associated with the second data tile read pattern, wherein the second data tile prefetching algorithm operates to prefetch data tiles from the memory component and store the prefetched data tiles in the tile-aware cache.

24. The computer program product of claim 21, wherein the processing component is unaware of the tile-based address structure of the memory component and each data request from the processing component comprises a linear memory address.

25. The computer program product of claim 24, further comprising querying a lookup table to determine a compressed data memory address that is mapped to the linear memory address.

26. The computer program product of claim 21, wherein the first data tile read pattern is one of a horizontal stripe read pattern, a vertical stripe read pattern, a horizontal patch read pattern, a vertical patch read pattern, a randomly-located horizontal patch read pattern, and a randomly-located vertical patch read pattern.

* * * * *